United States Patent
Ogasahara et al.

(10) Patent No.: US 8,724,518 B2
(45) Date of Patent: May 13, 2014

(54) COMMUNICATION SYSTEM, NODE, TERMINAL, PROGRAM AND COMMUNICATION METHOD

(75) Inventors: Daisaku Ogasahara, Tokyo (JP); Masahiro Sakauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1321 days.

(21) Appl. No.: 11/997,712

(22) PCT Filed: Aug. 1, 2006

(86) PCT No.: PCT/JP2006/315568
§ 371 (c)(1), (2), (4) Date: Feb. 1, 2008

(87) PCT Pub. No.: WO2007/018164
PCT Pub. Date: Feb. 15, 2007

(65) Prior Publication Data
US 2010/0158002 A1 Jun. 24, 2010

(30) Foreign Application Priority Data
Aug. 5, 2005 (JP) .................................. 2005-228940

(51) Int. Cl.
*H04L 12/28* (2006.01)
*H04L 12/56* (2006.01)
(52) U.S. Cl.
CPC ...................................... *H04L 45/00* (2013.01)
USPC .......................................... 370/258; 370/392
(58) Field of Classification Search
USPC .................................. 370/254, 389, 392, 258
See application file for complete search history.

(56) References Cited

U.S. PATENT DOCUMENTS

| 6,538,987 | B1 * | 3/2003 | Cedrone et al. | 370/216 |
| 6,754,200 | B1 * | 6/2004 | Nishimura et al. | 370/349 |
| 7,450,527 | B2 * | 11/2008 | Ashwood Smith | 370/255 |
| 7,813,263 | B2 * | 10/2010 | Chang et al. | 370/216 |
| 2003/0108052 | A1 * | 6/2003 | Inoue et al. | 370/399 |

(Continued)

FOREIGN PATENT DOCUMENTS

| JP | 60-062763 A | 4/1985 |
| JP | 4-235432 A | 8/1992 |
| JP | 10-285200 A | 10/1998 |
| JP | 2004-140776 A | 5/2004 |

(Continued)

OTHER PUBLICATIONS

"RPR (Resilient Packet Ring)", IEEE Standards 802.17, IEEE, 2004.

*Primary Examiner* — Kan Yuen
(74) *Attorney, Agent, or Firm* — Sughrue Mion, PLLC

(57) ABSTRACT

In a communication system formed of two or more networks in which a part or all of nodes belonging to each said network form a plurality of combinations of nodes so as not to overlap with other node on the network to which each node belongs, the nodes belonging to the same combination are connected with each other and terminals are connected under the control of a part or all of the nodes belonging to the same combination, a node belonging to the combination transmits a frame received from a terminal under the control of the node itself to any of adjacent nodes on the network to which the node itself belongs and a node belonging to the same combination to which the node itself belongs and connected to the node itself. This obtains a highly reliable communication system whose desired transmission capacity can be realized at low costs and which can be restored from an abnormal state in a short time period.

11 Claims, 23 Drawing Sheets

(56) References Cited

U.S. PATENT DOCUMENTS

2003/0147345 A1* 8/2003 Takagi et al. .............. 370/222
2005/0129059 A1* 6/2005 Jiang et al. ................ 370/466
2005/0152359 A1* 7/2005 Giesberts et al. ........... 370/389
2006/0002309 A1* 1/2006 Ban ........................... 370/254

FOREIGN PATENT DOCUMENTS

| JP | 2004-221805 A | 8/2004 |
| JP | 2005-033243 A | 2/2005 |
| WO | 2004-095779 A1 | 11/2004 |

* cited by examiner

FIG. 4

440 — FDB OF RPR NODE 100

| MAC ADDRESS OF TERMINAL | MAC ADDRESS OF RPR NODE |
|---|---|
| MAC ADDRESS OF NODE 300 | MAC ADDRESS OF RPR NODE 100 |
| MAC ADDRESS OF NODE 310 | MAC ADDRESS OF RPR NODE 110 |
| MAC ADDRESS OF NODE 320 | MAC ADDRESS OF RPR NODE 120 |
| MAC ADDRESS OF NODE 330 | MAC ADDRESS OF RPR NODE 130 |

FIG. 5

4501 — NETWORK CONNECTION INFORMATION TABLE OF RPR NODE 100

| PORT NUMBER | NODE INFORMATION |
|---|---|
| P4, P5 | RPR NODE 200, MAC ADDRESS OF RPR NODE 200 |

FIG. 6

NETWORK CONNECTION INFORMATION TABLE OF
RPR NODE 100

4502

| INFORMATION RELATED TO RPR NETWORK 10 | | | INFORMATION RELATED TO RPR NETWORK 20 | | |
|---|---|---|---|---|---|
| RPR NODE | PORT STATE OF PORT P1 | PORT STATE OF PORT P2 | RPR NODE | PORT STATE OF PORT P1 | PORT STATE OF PORT P2 |
| RPR NODE 100 | VALID | VALID | RPR NODE 200 | VALID | VALID |
| RPR NODE 110 | VALID | VALID | RPR NODE 210 | VALID | VALID |
| RPR NODE 120 | VALID | VALID | RPR NODE 220 | VALID | INVALID |
| RPR NODE 130 | INVALID | INVALID | RPR NODE 230 | VALID | VALID |

PORT STATE MANAGEMENT DATA BASE OF RPR NODE 100

| RPR NODE | PORT STATE OF OUTPUT PORT 510-3 |
|---|---|
| RPR NODE 100 | VALID |
| RPR NODE 200 | INVALID |

FIG. 17

4501 NETWORK CONNECTION INFORMATION TABLE
OF NODE 700

| PORT NUMBER | NODE INFORMATION |
|---|---|
| P4, P5 | RPR NODE 100, MAC ADDRESS OF RPR NODE 100 |
| P6, P7 | RPR NODE 200, MAC ADDRESS OF RPR NODE 200 |

COMMUNICATION SYSTEM, NODE, TERMINAL, PROGRAM AND COMMUNICATION METHOD

TECHNICAL FIELD

The present invention relates to a communication system and, more particularly, highly reliable communication system, node, terminal, program and communication method.

BACKGROUND ART

In recent years, a rapidly increasing volume of traffic due to the spread of the Internet has been pressing a communication band of trunk system communication systems.

When a communication band of a communication system is pressed, congestion occurs frequently to cause a problem that communication is allowed intermittently or a problem that communication stops completely or the like.

Demanded accordingly is a technique enabling continuous provision of stable communication by expanding a transmission capacity of a communication system.

In addition, because when in such a trunk system communication system as transferring a large volume of traffic, occurrence of such abnormality as link cut-off or a network node (hereinafter simply referred to as a node) failure exerts a large effect in a wide range, demanded is a highly reliable technique of a communication system which enables stable communication to be continued even when such abnormal situation as described above occurs.

Generally widely known as a network protocol which realizes such a stable communication system as described above is a Resilient Packet Ring (RPR) disclosed in IEEE Standards 802.17 (Literature 1) as standardization document issued by IEEE (Institute of Electrical and Electronics Engineers) in 2004.

RPR is a network protocol for transferring a frame on a network having such ring topology as shown in FIG. 25.

A communication system shown in FIG. 25 is an example in which with an RPR network (hereinafter referred to as an RPR network) formed by four nodes operable based on RPR (hereinafter referred to as an RPR node), one terminal node is accommodated under the control of each RPR node.

Known as a main characteristic of RPR is a high-speed protection function.

In a case, for example, where in an RPR network, when a link between RPR nodes is cut off, immediately after RPR nodes on the opposite sides of the link detect the cut-off, all the RPR nodes are notified to that effect instantly.

The RPR node being notified is allowed to continue communication because traffic is transmitted so as to detour the link cut-off part.

Since RPR is designed to recover communication within as short a time period as 50 ms equal to that of SDH (Synchronous Digital Hierarchy) or SONET (Synchronous Optical Network) premised on adoption to a trunk system communication system in which a large volume of traffic flows as in a city network, it is possible to set up a highly reliable communication system.

When the volume of traffic exceeds a transmission capacity originally presumed at the set-up of an RPR network to press a communication band of the RPR network, a simplest and common method as a method of increasing a transmission capacity of the already set-up RPR network is newly setting up an RPR network having a larger transmission capacity by using an RPR node with a communication interface using an optical part and an electric part operable at a higher bit rate mounted and then shifting to the new RPR network.

Also possible is a method of applying the technique disclosed in Japanese Patent Laying-Open No. 10-285200 (Literature 2) to an RPR network.

More specifically, with a plurality of RPR networks connected by a relay node and with a network formed to have a terminal disposed under the control of a relay node as well, the relay node distributes and transfers a data frame received from the terminal to any of the plurality of RPR networks.

With the foregoing arrangement, traffic received from the terminal is distributed and transferred to the plurality of RPR networks to enable a transmission capacity of the RPR network as a whole to be increased.

Literature 1: "RPR (Resilient Packet Ring)", IEEE Standards 802.17, IEEE, 2004.
Literature 2: Japanese Patent Laying-Open No. 10-285200.
Literature 3: Japanese Patent Laying-Open No. 2004-140776.

When increasing a transmission capacity of the RPR network, however, the above-described related art has the following problems.

In a case of the method of shifting to a communication system having a larger transmission capacity which is formed of a node with a communication interface using an optical part and an electric part operable at a higher bit rate mounted, the node mounted with the high-speed interface is extremely expensive to require enormous costs for setting up a new RPR network.

When a future change in the volume of traffic is hard to estimate, in particular, since there is no other choice than to use a node having a communication interface operable at the maximum speed among usable communication interfaces, communication system set-up will cost more.

Even when a future change in the volume of traffic can be estimated, because speed of the communication interface lacks diversity, a communication system whose transmission capacity is far larger than a desired transmission capacity should be set up, so that extra cost will be required.

In addition, in terms of reliability of a communication system, in a case of RPR, when an RPR node forming an RPR network develops a fault, while communication between terminals under other RPR node than the RPR node in question can be maintained, communication between a terminal under the failing RPR node and other terminal can not be maintained.

On the other hand, as disclosed in Literature 2, when the transmission capacity of the RPR network is increased by the method of distributing traffic to a plurality of RPR networks by a relay node, between the relay node and the RPR network, and between the relay node and the terminal are each connected by only one link and besides, the relay node itself is not structured to be redundant.

In other words, as architecture for setting up a trunk communication system, it can not help saying that it lacks reliability.

Literature 2 fails to disclose a data frame transfer method executed when in any of a plurality of RPR networks connected to a relay node, such abnormality of cut-off of communication between at least two RPR nodes among the RPR nodes forming the RPR network occurs as a failure of an RPR node.

An object of the present invention, in view of such problems of the related art as described above, is to provide a highly reliable communication system whose desired transmission capacity can be realized at low costs and which can be restored from an abnormal state in a short time period.

SUMMARY

In order to attain the above-described objects, the present invention is characterized in that with a communication system set up by combining a plurality of networks having an arbitrary transmission capacity, traffic is distributed to the plurality of networks in a normal state to expand the transmission capacity of the communication system, while in an abnormal state, traffic is distributed to the plurality of networks so as to detour an failing part, thereby continuing communication.

According to an exemplary aspect of the invention, in a communication system formed of two or more networks, in which a part or all of nodes belonging to each of the networks form a combination of a plurality of nodes so as not to overlap with other node on the network to which each node belongs, the nodes belonging to the same combination are connected with each other and a terminal is connected under a part or all of the nodes belonging to the same combination, the node belonging to the combination transmits a frame received from the terminal under the node itself to either an adjacent node on the network to which the node itself belongs or a node which belongs to the same combination as that of the node itself and which is connected to the node itself.

In order to attain the above-described objects, the present invention is characterized in that a node belonging to the combination is connected to any of nodes belonging to other network through a plurality of paths.

The present invention attains the following effects.

First, in a normal state and an abnormal state, nodes formed in combination so as not to overlap with other node belonging to each of two or more networks, each transmits a frame received from a terminal under the control of the node itself to either an adjacent node on the network to which the node itself belongs or a node which belongs to the same combination as that of the node itself and is connected to the node itself, thereby expanding a transmission capacity of the communication system.

Secondly, connecting a node belonging to a combination to any node belonging to other network through a plurality of paths enables a highly reliable communication system to be set up.

BRIEF DESCRIPTION OF THE DRAWINGS

FIG. 4 is a diagram showing an FDB 440 according to the first exemplary embodiment;

FIG. 5 is a diagram showing an example of network connection information 4501 of a TDB 450 according to the first exemplary embodiment;

FIG. 6 is a diagram showing an example of network connection information 4502 of the TDB 450 according to the first exemplary embodiment;

FIG. 7 is a diagram showing a port state management data base 490 according to the first exemplary embodiment;

FIG. 17 is a diagram showing a network connection information table 4501 of a TDB 450 according to the second exemplary embodiment;

EXEMPLARY EMBODIMENT

First Exemplary Embodiment

In the following, a communication system according to a first exemplary embodiment of the present invention will be detailed with reference to the drawings.

(Structure of Communication System)

Figure 1:
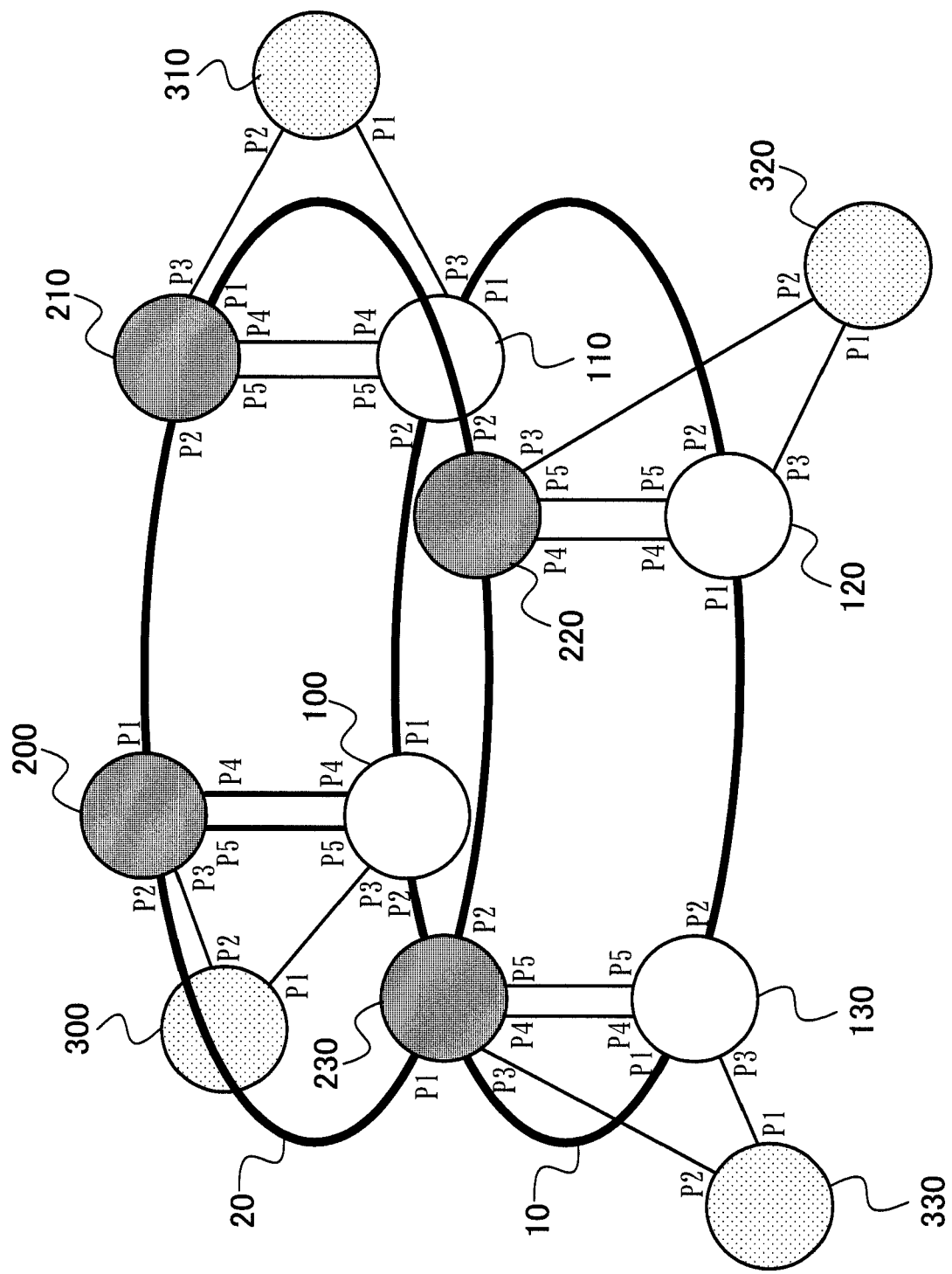
FIG. 1 is a schematic diagram showing a structure of a communication system according to a first exemplary embodiment of the present invention.

FIG. 1 is a schematic diagram showing an example of a structure of a communication system according to the first exemplary embodiment to which the present invention is applied.

Figure 2:
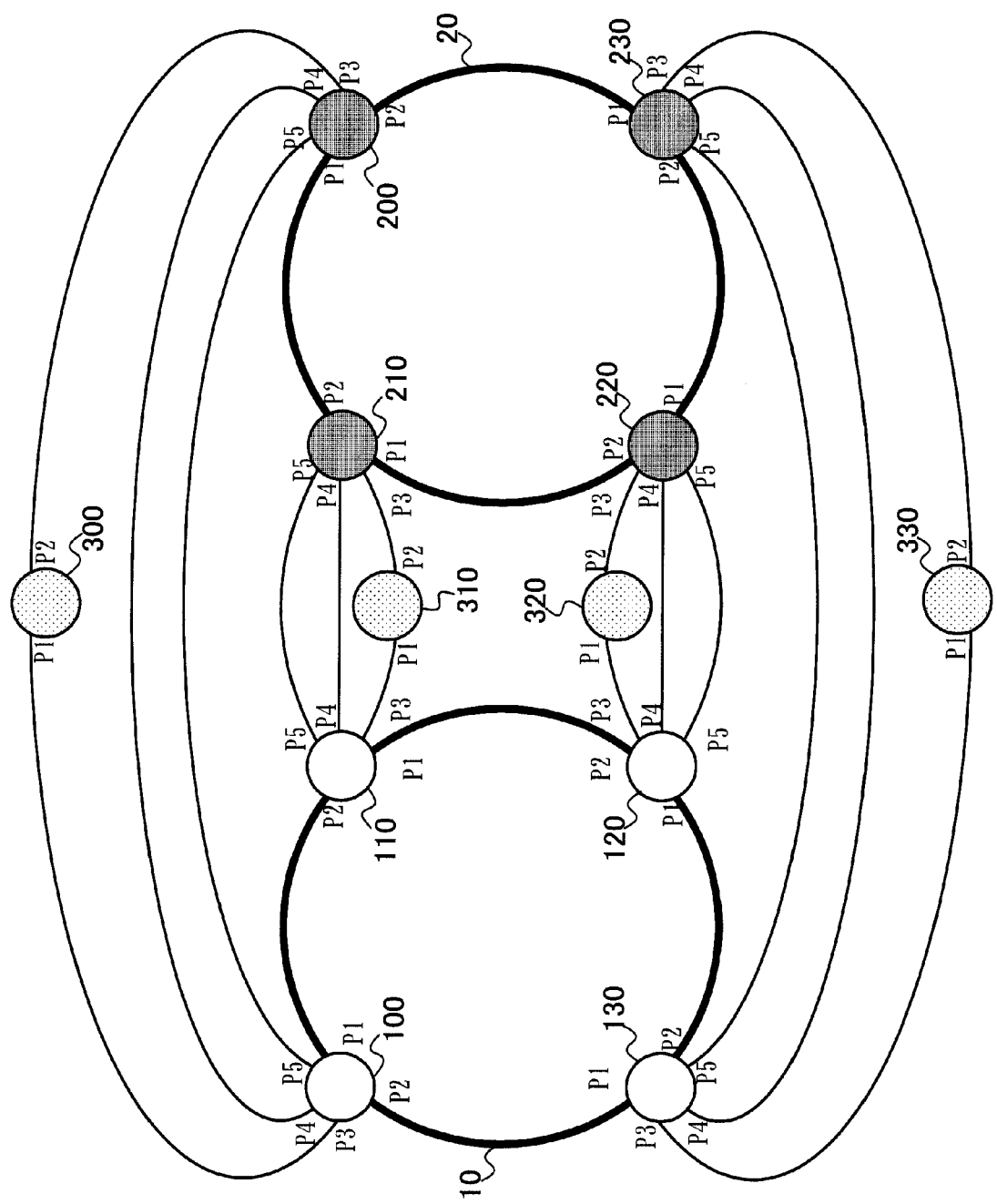
FIG. 2 is a schematic diagram showing a structure of the communication system according to the first exemplary embodiment in plane.

FIG. 2 is a diagram showing FIG. 1 in plane so as to make connection between the respective nodes in FIG. 1 clear.

The communication system shown in FIG. 1 is a communication system comprising an RPR network 10 formed of RPR nodes 100~130, an RPR network 20 formed of RPR nodes 200~230, and nodes 300~330.

Here, the RPR nodes 100~130 and the RPR nodes 200~230 are RPR nodes operable based on IEEE 802.17 and also nodes to which the present invention is applied.

The RPR network 10 and the RPR network 20 are connected by two links, a link between a port P4 of the RPR node 100 and a port P4 of the RPR node 200 and a link between a port P5 of the RPR node 100 and a port P5 of the RPR node 200.

Similarly, the RPR network 10 and the RPR network 20 are connected also by two links between the RPR node 110 and the RPR node 210, between the RPR node 120 and the RPR node 220 and between the RPR node 130 and the RPR node 230.

The node 300 is a terminal under the control of the RPR node 100 and the RPR node 200 and is connected to either one or both of the RPR node 100 and the RPR node 200.

When connecting the node 300 to both the RPR node 100 and the RPR node 200, link aggregation or the like is applied to a port P1 and a port P2 of the node 300 to set such that the RPR node 100, the RPR node 200 and the node 300 fail to form a loop.

The node 310 is a terminal under the control of the RPR node 110 and the RPR node 210, the node 320 is a terminal under the control of the RPR node 120 and the RPR node 220, and the node 330 is a terminal under the control of the RPR node 130 and the RPR node 230.

Although the present exemplary embodiment is not premised on a communication system in which under the control of the nodes 300~330 for simplicity, another node or other network is connected, to a communication system having such structure, the contents described in the present exemplary embodiment are applicable unless no loop is formed.

As shown in FIG. 1 and FIG. 2, for setting up the communication system according to the present exemplary embodiment by an RPR network, first prepare a plurality of RPR networks each formed of RPR nodes.

Next, select one RPR node from each RPR network so as not to overlap with each other to form as many combination as the number of RPR nodes forming the RPR network.

In other words, the nodes are connected such that two or more RPR nodes on the same RPR network fail to belong to the same combination described above.

Furthermore, connect a node of the terminal to a part or all of the RPR nodes included in each combination.

The number of RPR nodes on the RPR network needs not to be the same between the respective RPR networks.

When the terminal is connected to a plurality of RPR nodes, link aggregation or the like is applied to set to prevent formation of a loop as described above.

(Structure of Node)

Figure 3:
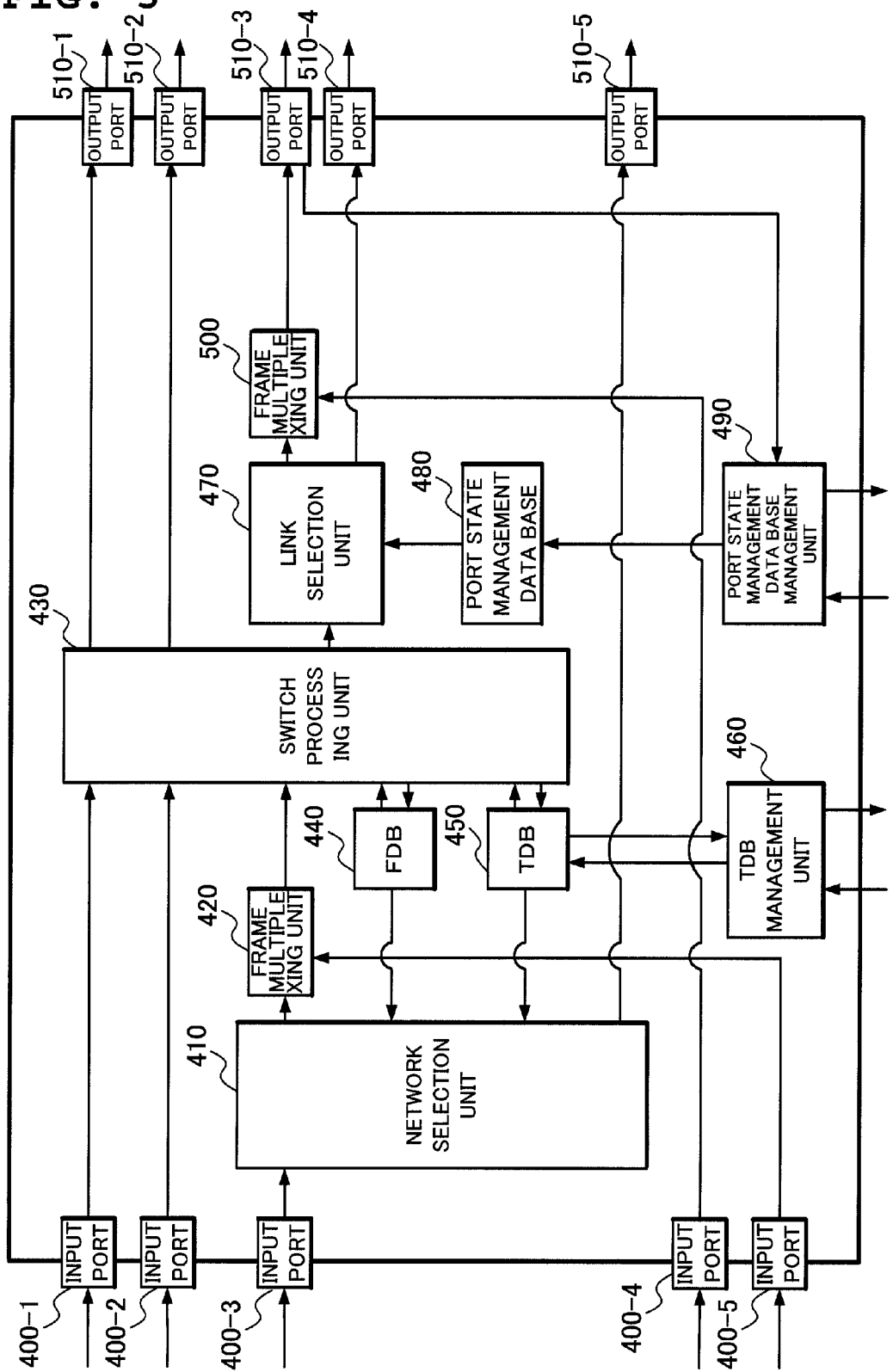
FIG. 3 is a block diagram showing a structure of RPR nodes 100~130 and RPR nodes 200~230 according to the first exemplary embodiment.

FIG. 3 is a block diagram showing structures of the RPR nodes 100~130 and the RPR nodes 200~230 in the communication system shown in FIG. 1.

In the following, although the structure of the RPR node 100 will be described, the structures of the RPR nodes 110~130 and the RPR nodes 200~230 are the same as that of the RPR node 100.

As shown in FIG. 3, the RPR node 100 comprises input ports 400-1~5, a network selection unit 410, a frame multiplexing unit 420, a switch processing unit 430, an FDB 440, a TDB 450, a TDB management unit 460, a link selection unit 470, a port state management data base 480, a port state management data base management unit 490, a frame multiplexing unit 500 and output ports 510-1~5.

The input ports 400-1~5 of the RPR node 100 are ports which correspond to the reception side of ports P1~P5 of the RPR node 100 shown in FIG. 1 and are for receiving a frame transmitted from an adjacent node.

Similarly, the output ports 510-1~5 of the RPR node 100 correspond to the transmission side of the ports P1~P5 of the RPR node 100 in FIG. 1.

The input port 400-1 of the RPR node 100 is a port which receives an RPR frame transmitted from the output port 510-2 of the RPR node 110.

The input port 400-2 of the RPR node 100 is a port which receives an RPR frame transmitted from the output port 510-1 of the RPR node 130.

The input port 400-3 of the RPR node 100 is a port which receives an Ethernet (registered trademark) frame transmitted from the port P1 of the node 300.

The input port 400-4 of the RPR node 100 is a port which receives a frame transmitted from the output port 510-4 of the RPR node 200.

The input port 400-5 of the RPR node 100 is a port which receives a frame transmitted from the output port 510-5 of the RPR node 200.

The network selection unit 410 of the RPR node 100 confirms a connection condition of the RPR networks 10 and 20 with reference to the FDB 440 and the TDB 450 which will be described later to determine whether to distribute (transfer) an Ethernet (registered trademark) frame received at the input port 400-3 of the RPR node 100 to the RPR network 10 or distribute (transfer) the same to the RPR network 20.

Distribution (transfer) of the received frame may be executed based on a transfer condition which is determined in advance. Possible transfer conditions include, for example, transfer of an MAC address of a received frame as a condition, transfer of a network load as a condition and transfer of predetermined priority as a condition. In a case where voice data is transferred to the RPR network 20 and image data is transferred to the RPR network 10, possible is a case where a large user transfers the data to the RPR network 10 and a small individually user transfers the data to the RPR network 20.

The frame multiplexing unit 420 of the RPR node 100 multiplexes a frame from the network selection unit 410 of the RPR node 100 and a frame from the input port 400-5 of the RPR node 100 to send the obtained result to the switch processing unit 430 of the RPR node 100.

The RPR node 100 may be structured to have the frame multiplexing unit 420 of the RPR node 100 contained in the switch processing unit 430 of the RPR node 100.

Also, in such a communication system having the port P4 and the port 5 of the RPR node 100 and the port P4 and the port P5 of the RPR node 200 connected by using a packet switch as described above, the RPR node 100 and the RPR node 200 may be structured to have the frame multiplexing units 420 of the RPR node 100 and the RPR node 200 contained in the switch processing units 430 of the RPR node 100 and the RPR node 200, respectively.

The switching processing unit 430 of the RPR node 100 executes all the processing related to the RPR recited in IEEE 802.17.

Among examples of processing executed by the switch processing unit 430 of the RPR node 100 are generation of an RPR frame, transfer of an RPR frame, management of a terminal accommodated in each RPR node (learning of a MAC address of a terminal under its control), management of a topology data base (TDB) by a topology discovery protocol, dynamic control of a communication band of traffic on the RPR network 10 by fairness, and management of the RPR network 10 by OAM (Operations Administration and Maintenance).

As to a received frame, the switch processing unit 430 of the RPR node 100 refers to the FDB 440 and the TDB 450 which will be described later to confirm connection conditions of the RPR networks 10 and 20 and distribute (transfer) the frame similarly to the above-described network selection unit 410 of the RPR node 100. The switch processing unit 430 is further allowed to determine the same transfer conditions as those of the above-described network selection unit 410.

In the following, no description of the details of the processing of the above-described switch processing unit 430 will be made except those of operation closely related to the operation of the present invention.

The FDB 440 of the RPR node 100 is a data base for managing a terminal accommodated in the RPR nodes 100~130.

In the FDB 440 of the RPR node 100, a relationship between a MAC address of the terminal and a MAC address of an RPR node in which the terminal is accommodated is registered by the switch processing unit 430 of the RPR node 100.

FIG. 4 is a diagram showing an example of the FDB 440 of the RPR node 100.

In the second entry of the FDB 440 shown in FIG. 4, for example, registered are a MAC address of the node 310 and a MAC address of the RPR node 110 in which the node 310 is accommodated.

The TDB 450 of the RPR node 100 is a data base for managing information about a topology state, failure occurrence conditions and the like of the RPR network 10 and the RPR network 20 and network connection information.

The network connection information includes a port number of a port that a node has and node information for identifying a node as a connection destination on other network to which the node is connected, which indicates to which of nodes a port that the node in question has is connected.

Among the information managed by the TDB 450 of the RPR node 100, information related to the RPR network 10 to which the RPR node 100 belongs is managed by a topology discovery protocol operable by the switch processing unit 430 of the RPR node 100.

FIG. 5 and FIG. 6 are diagrams showing examples of network connection information of the TDB 450 of the RPR node 100.

FIG. 5 is a diagram of a network connection information table 4501 indicating to which of the nodes of the RPR network 20 as other network each port of the RPR node 100 is connected, with a port number and node information for identifying a node connected to each port (node number and MAC address) as a component.

With reference to FIG. 5, it is shown that at the port P4 and the port P5, the RPR node 100 is connected to the RPR node 200 which is identified by a MAC address xx:xx:xx:xx, for example.

While in the present exemplary embodiment, a MAC address of a node is used as node information, anything that can identify a node connected to each port is usable and for example, an IP address of a node can be used.

FIG. 6 is a network connection information table 4502 indicative of port states of the port P1 and the port P2 of an RPR node which are managed for each RPR node forming the RPR network 10 and the RPR network 20.

For example, in the TDB 450 of the RPR node 100 in FIG. 6, the port state of the port P1 of the RPR node 220 is valid and the port state of the port P2 of the RPR node 220 is invalid.

This state represents that the RPR node 220 is capable of transmitting and receiving an RPR frame at the port P1 and is incapable of transmitting and receiving an RPR frame at the port P2.

Furthermore, it can be found that in the network connection information table 4502 of the RPR node 100 in FIG. 6, the port states of the port P1 and the port P2 of the RPR node 130 are invalid, so that the RPR node 130 is allowed neither to transmit nor receive an RPR frame at the port P1 and the port P2, that is, in the RPR network 10, there exists no communication path allowed to transfer a frame to the RPR node 130.

When in such a state as described above, description is made that "the RPR node 130 has no connectivity with the RPR nodes 100~120 in the RPR network 10".

Among the information managed by the TDB 450 of the RPR node 100, the TDB management unit 460 of the RPR node 100 notifies the TDB management unit 460 of the RPR node 200 of information related to the RPR network 10, as well as registering information related to the RPR network 20 notified to the TDB management unit 460 of the RPR node 100 by the TDB management unit 460 of the RPR node 200 at the TDB 450 of the RPR node 100.

As a result of the operation of the TDB management units 460 of the RPR node 100 and the RPR node 200, at the TDB 450 of the RPR node 100 and the RPR node 200, information related to topology of both the RPR networks, the RPR network 10 and the RPR network 20, is registered.

The link selection unit 470 of the RPR node 100 sends a frame to the frame multiplexing unit 500 of the RPR node 100 or the output port 510-4 of the RPR node 100 according to a port state of the output port 510-4 of the RPR node 100.

The port state management data base 480 of the RPR node 100 is a data base for managing a port state of a port to which a terminal under the control of the RPR node 100 and the RPR node 200 is connected, that is, the output port 510-3.

FIG. 7 is a diagram showing an example of the port state management data base 480 of the RPR node 100.

In the port state management data base 480 of the RPR node 100 in FIG. 7, the port state of the output port 510-3 of the RPR node 100 is valid and the port state of the output port 510-3 of the RPR node 200 is invalid.

This state represents that the RPR node 100 is allowed to transmit a frame to the node 300 under its control from the output port 510-3 of the RPR node 100 and the RPR node 200 is not allowed to transmit a frame to the node 300 under its control from the output port 510-3 of the RPR node 200.

The port state management data base management unit 490 of the RPR node 100 monitors a port state of the output port 510-3 of the RPR node 100 to register the state at the output port state management data base 480 of the RPR node 100.

In addition, among information managed by the port state management data base 480 of the RPR node 100, the port state management data base management unit 490 of the RPR node 100 notifies the port state of the output port 510-3 of the RPR node 100 to the port state management data base management unit 490 of the RPR node 200, as well as registering information of the output port 510-3 of the RPR node 200 notified to the port state management data base management unit 490 of the RPR node 100 by the port state management data base management unit 490 of the RPR node 200 at the port state management data base 480 of the RPR node 100.

As a result of the operation of the port state management data base management units 490 of the RPR node 100 and the RPR node 200, the port states of the output ports 510-3 of the RPR node 100 and the RPR node 200 are registered at the port state management data bases 480 of the RPR node 100 and the RPR node 200.

The frame multiplexing unit 500 of the RPR node 100 multiplexes a frame from the link selection unit 470 of the RPR node 100 and a frame from the input port 400-4 of the RPR node 100 and transmits the obtained result through the output port 510-3 of the RPR node 100.

Here, description will be made of a connection relationship between the input ports 400-1~400-5 and the output ports 510-1~510-5 of the RPR node 100 and the other components of the RPR node 100.

Each input port and output port may be fixedly connected to each component or may have an interface management (not shown) or the like provided to change a relationship with each component. Changing a connection relationship with each component is enabled, for example, by changing address designation of a memory in which input data from each input port is temporarily held from the network selection unit 410, by providing a physical switch or the like.

Figure 8:
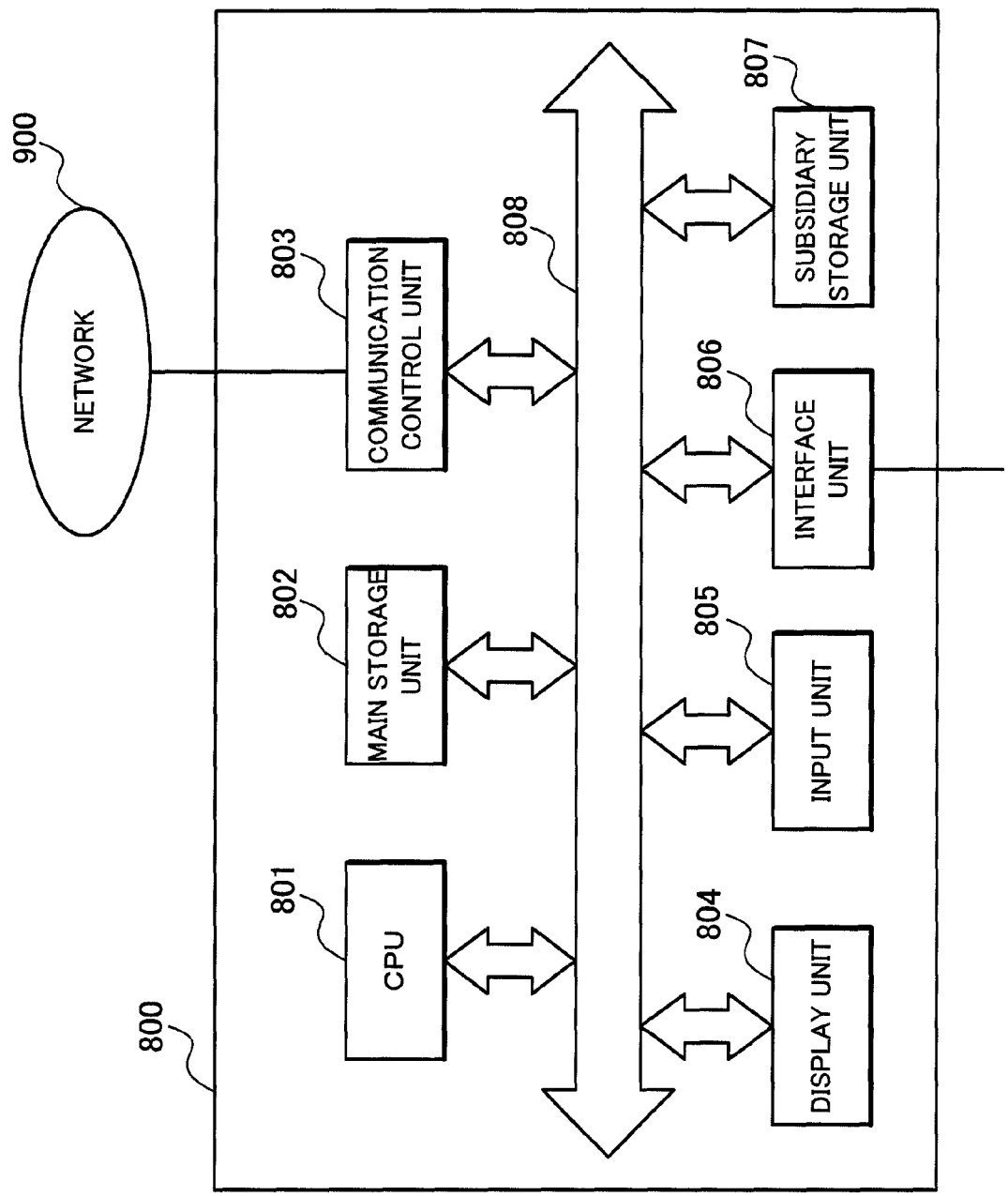
FIG. 8 is a diagram showing a hardware structure of the RPR node according to the first exemplary embodiment.

FIG. 8 is a block diagram showing a hardware structure.

FIG. 8 is a block diagram showing a hardware structure of the RPR node 100 of the communication system according to the present exemplary embodiment.

With reference to FIG. 8, the RPR node 100 according to the present invention can be realized by the same hardware structure as that of a common computer device, which comprises a CPU (Central Processing Unit) 801, a main storage unit 802 such as a RAM (Random Access Memory), a communication control unit 803 for transmitting and receiving data through a network 900, a display unit 804 such as a liquid crystal display or a printer, an input unit 805 such as a key operation unit, an interface unit 806 connected to an external device for transmitting and receiving data, a subsidiary storage unit 807 as a hard disk device formed of a non-volatile memory such as a magnetic disc or a semiconductor memory, and a system bus 808 for connecting the above-described components of the RPR node 100 according to the present invention.

The RPR node 100 according to the present invention has its operation realized not only as hardware with a circuit part formed of such a hardware part as LSI (Large Scale Integration) having a program which realizes such functions incorporated in the RPR node 100 mounted but also as software by executing a program which provides each function of each of the above-described components on the CPU 801 on the computer processing device.

More specifically, the CPU 801 realizes the above-described functions as software by loading a program stored in the subsidiary storage unit 807 into the main storage unit 802 and executing the same or directly executing the same on the subsidiary storage unit 807 to control operation of the RPR node 100.

(Operation of Frame Transfer in Normal State)

Figure 9:
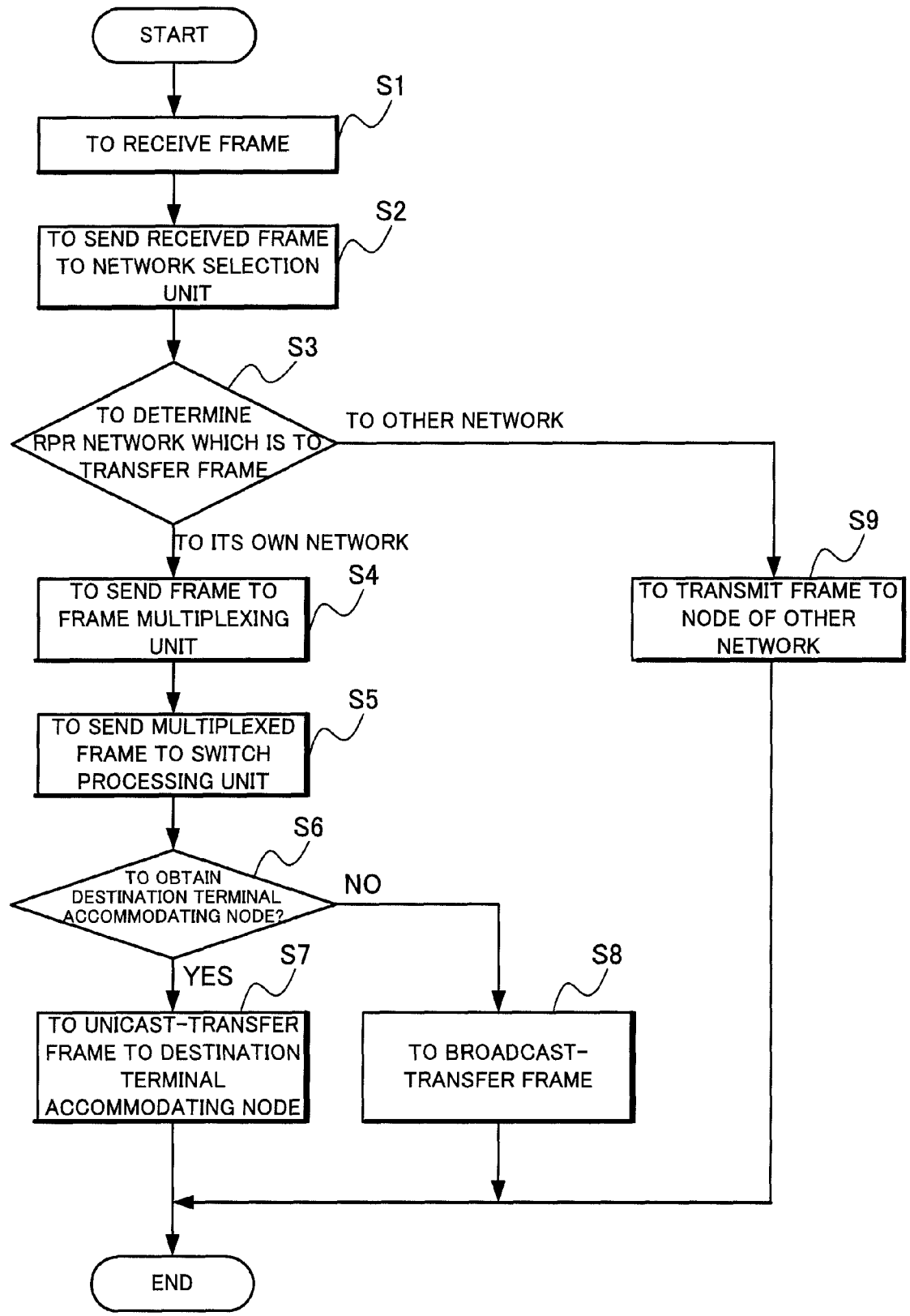
FIG. 9 is a flow chart showing operation of the RPR node according to the first exemplary embodiment.

In the following, description will be made of operation of transferring a frame from the node 300 to the node 320 in the normal state in the communication system in FIG. 1 with reference to the flow chart shown in FIG. 9.

The node 300 transmits an Ethernet (registered trademark) frame directed to the node 320 from either one of the port P1 and the port P2 of the node 300.

In the following, description will be made of a case where the node 300 transmits an Ethernet (registered trademark) frame from the port P1 of the node 300 to the RPR node 100.

First, description will be made of operation of the RPR node 100 to receive and transfer an Ethernet (registered trademark) frame transmitted from the node 300 with reference to the flow chart shown in FIG. 9.

Upon receiving an Ethernet (registered trademark) frame directed to the node 320 at an input port 300-3 of the RPR node 100 (Step S1), the RPR node 100 sends the frame to the network selection unit 410 of the RPR node 100 (Step S2).

The network selection unit 410 of the RPR node 100 determines an RPR network which is to transfer a frame according a frame distribution algorithm which will be described later (Step S3).

When determination is made to transfer a frame by the RPR network 10, the network selection unit 410 of the RPR node 100 sends the frame to the frame multiplexing unit 420 of the RPR node 100 (Step S4).

After multiplexing the frame from the network selection unit 410 of the RPR node 100 and a frame from the input port 400-5 of the RPR node 100, the frame multiplexing unit 420 of the RPR node 100 sends the result to the switch processing unit 430 of the RPR node 100 (Step S5).

By searching the FDB 440 of the RPR node 100 with a destination MAC address of the Ethernet (registered trademark) frame as a key, the switch processing unit 430 of the RPR node 100 obtains an RPR node (destination terminal accommodating node) in which the node 320 is accommodated (Step S6).

When the acquisition of the RPR node succeeds to find that the RPR node in which the node 320 is accommodated is the RPR node 120, the switch processing unit 430 of the RPR node 100 unicast-transfers the frame to the RPR node 120 (Step S7).

More specifically, after storing the MAC address of the RPR node 120 in the destination MAC address and storing the MAC address of the RPR node 100 in the transmission source MAC address to generate an RPR frame with an Ethernet (registered trademark) frame directed to the node 320 stored in the payload, the switch processing unit 430 of the RPR node 100 transmits the generated RPR frame through either the output port 510-1 or the output port 510-2 of the RPR node 100.

The unicast-transferred RPR frame is transferred to the RPR node 120 through the RPR network 10 according to the unicast frame transfer method recited in IEEE802.17.

On the other hand, when the acquisition of the RPR node fails (Step S6), the switch processing unit 430 of the RPR node 100 broadcast-transfers the frame as an unknown unicast frame which is a frame whose destination node identifier is unknown (Step S8).

More specifically, after storing the broadcast MAC address in the destination MAC address and storing the MAC address of the RPR node 100 in the transmission source MAC address to generate an RPR frame with a frame directed to the node 320 stored in the payload, the switch processing unit 430 of the RPR node 100 transmits the generated RPR frame through either the output port 510-1 or the output port 510-2 of the RPR node 100.

The broadcast-transferred RPR frame is transferred to all the RPR nodes forming the RPR network other than the RPR node 100, that is, to the RPR nodes 110~130 through the RPR network 10 according to the broadcast frame transfer method recited in IEEE802.17.

In the foregoing, the description has been made of the frame transfer method in a case where an Ethernet (registered trademark) frame transmitted from the node 300 is a unicast frame directed to the node 320 from the node 300.

When the Ethernet (registered trademark) frame transmitted from the node 300 is an Ethernet (registered trademark) frame whose destination MAC address is a broadcast MAC address (broadcast frame) or whose destination MAC address is a multicast MAC address (multicast frame), the RPR node 100 transfers the frame similarly to the above-described unknown unicast frame.

Next, description will be made of a case where the frame distribution algorithm of the network selection unit 410 of the RPR node 100 determines to transfer a frame by the RPR network 20 (Step S3).

At this time, the network selection unit 410 of the RPR node 100 transmits the frame from the output port 510-5 of the RPR node 100 to the input port 400-5 of the RPR node 200 (Step S9).

Upon receiving the frame at the input port 400-5 of the RPR node 200, the RPR node 200 sends the frame to the frame multiplexing unit 420 of the RPR node 200.

After multiplexing the frame from the network selection unit 410 of the RPR node 200 and the frame from the input port 400-5 of the RPR node 200, the frame multiplexing unit 420 of the RPR node 200 sends the obtained result to the switch processing unit 430 of the RPR node 200 (Step S5).

Since operation to follow which is executed by the RPR node 200 to transmit the RPR frame to the RPR network 20 is the same as the above-described operation executed by the RPR node 100 to transmit an RPR frame to the RPR network 10 (Step S6~Step S8), no description will be made thereof.

Thus, the RPR frame transmitted from either the output port 510-1 or the output port 510-2 of the RPR node 200 is transferred to the RPR node 220 in which the node 320 is accommodated through the RPR network 20.

As a frame distribution algorithm for the network selection unit 410 of the RPR node 100 to determine an RPR network which is to transfer a frame in the normal state, an arbitrary algorithm such as round robin or weighing round robin can be used.

Also usable is an algorithm for determining an RPR network which is to transfer a frame based on a result of calculation with information of a frame header and a frame payload as a parameter.

Among possible parameters used in such an algorithm include a destination MAC address, a transmission source MAC address, priority, VLAN ID and Ether type of an Ethernet (registered trademark) frame, a destination IP address and a transmission source ID address of an IP packet stored in a frame payload, and a destination TCP port number and a transmission source TCP port number of a TCP packet stored in the IP packet.

For efficiently using a transmission capacity of a plurality of RPR networks forming the communication system while maintaining an order of frame arrival, frames should be distributed to each RPR network after classifying the frames minutely by using numbers of kinds of parameters.

Figure 10:
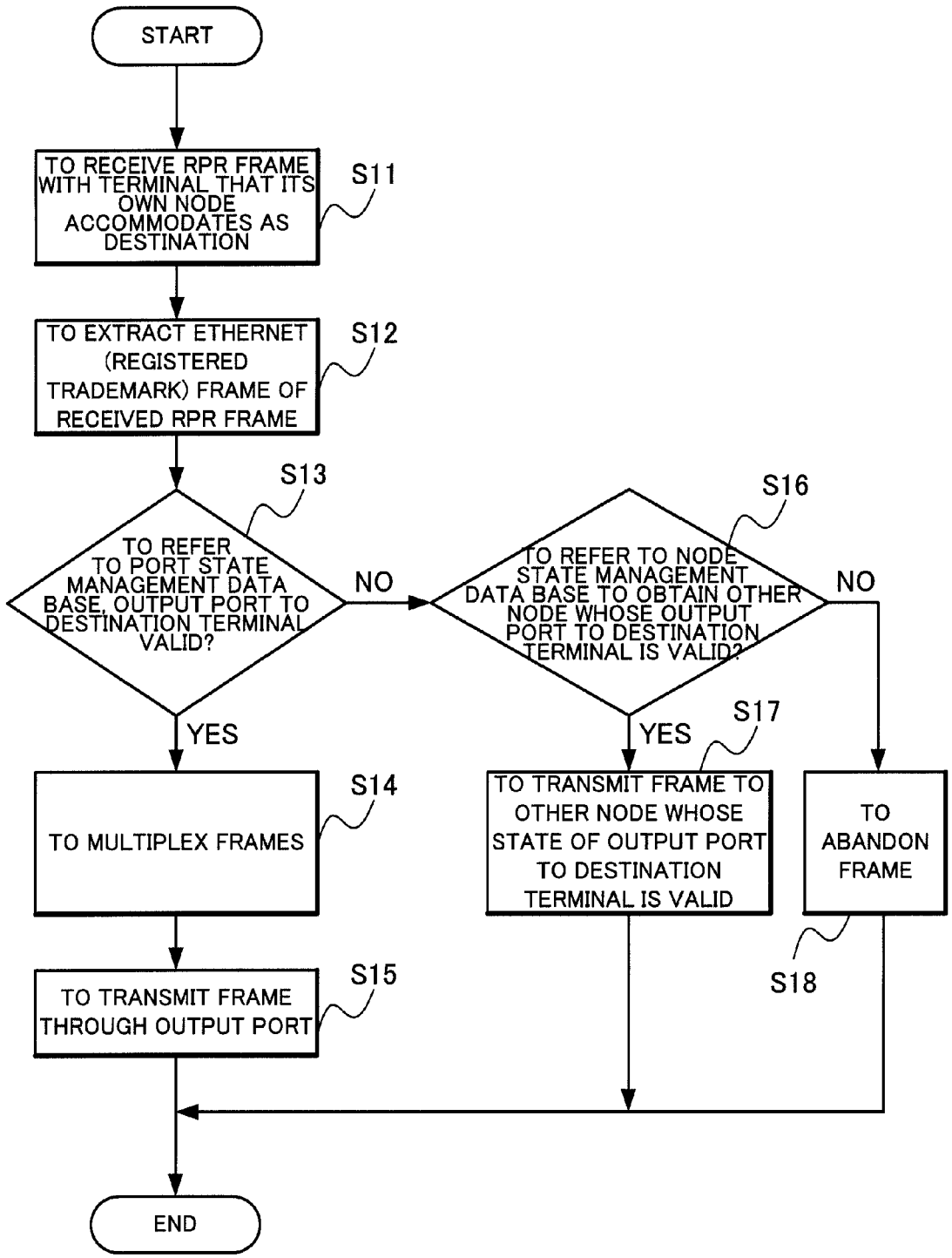
FIG. 10 is a flow chart showing operation of the RPR node according to the first exemplary embodiment.

Next, description will be made of operation executed by the RPR node 120, after the transmission of the RPR frame to the RPR network 10 by the RPR node 100, to receive the RPR frame at either the input port 400-1 or the input port 400-2 of the RPR node 120 and transfer the Ethernet (registered trademark) frame stored in the payload of the RPR frame to the node 320 with reference to the flow chart shown in FIG. 10.

Upon receiving an RPR frame at either the input port 400-1 or the input port 400-2 of the RPR node 120 (Step S11), the RPR node 120 sends the RPR frame to the switch processing unit 430 of the RPR node 120.

When the MAC address or the broadcast MAC address of the RPR node 120 is stored in the destination MAC address of the RPR frame, the switch processing unit 430 of the RPR node 120 extracts an Ethernet (registered trademark) frame stored in the payload of the received RPR frame (extracts identification information of a destination terminal) (Step S12) and sends the extracted result to the link selection unit 470 of the RPR node 120.

The link selection unit 470 of the RPR node 120 determines whether the port state of the output port 510-3 of the RPR node 120 is valid or not at the port state management data base 480 of the RPR node 120 (Step S13) and when determining that the port state is valid, after multiplexing a frame from the input port 400-4 of the RPR node 120 and a frame from the link selection unit 470 of the RPR node 120 (Step S14), the frame multiplexing unit 500 of the RPR node 120 transmits the Ethernet (registered trademark) frame to the node 320 from the output port 510-3 of the RPR node (Step S15).

When transfer of the Ethernet (registered trademark) frame to the node 320 is impossible because the port state of the output port 510-3 of the RPR node 120 is invalid, the link selection unit 470 of the RPR node 120 refers to the port state management data base 480 of the RPR node 120 to obtain an RPR node whose port state of the output port 510-3 is valid among RPR nodes connected to the node 320 (Step S16).

In the following, description will be made assuming that the port state of the output port 510-3 of the RPR node 220 is valid.

The link selection unit 470 of the RPR node 120 transmits the frame from the output port 510-4 of the RPR node 120 to the input port 400-4 of the RPR node 220 (Step S17).

The RPR node 220 sends the frame received at the input port 400-4 of the RPR node 220 to the frame multiplexing unit 500 of the RPR node 220.

After multiplexing the frame from the input port 400-4 of the RPR node 220 and the frame from the link selection unit 470 of the RPR node 220 (Step S14), the frame multiplexing unit 500 of the RPR node 220 transmits an Ethernet (registered trademark) frame from the output port 510-3 of the RPR node 220 to the node 320 (Step S15).

When as a result of search of the port state management data base 480 of the RPR 120, the link selection unit 470 of the RPR node 120 fails to obtain an RPR node whose port state of the output port 510-3 is valid, abandon the frame (Step S18).

As described in the foregoing, even when cut-off of the link between the RPR node 120 and the node 320 disables the RPR node 120 to transmit a frame to the node 320, passing through the node 220 enables frame transfer to the node 320.

With the foregoing method, the RPR node 120 and the RPR node 220 need to notify port states of the output ports 510-3 of the RPR nodes themselves with each other through the port state management data base management unit 490.

When the port states of their output ports 510-3 are not notified with each other and the port state of the output port 510-3 of its node is invalid, there is however another method of authorizing frame transfer to the node 320 to other appropriate RPR node.

When even an authorized RPR node fails to transfer a frame to the node 320 either, the authorized RPR node further authorizes frame transfer to still other RPR node.

When, for example, the port state of the output port 510-3 of the RPR node 120 is invalid, the link selection unit 470 of the RPR node 120 transmits a frame to the input port 510-4 of the RPR node 220 other than its own node because it is not allowed to transmit an Ethernet (registered trademark) frame from its own node although the port states of the output ports 510-3 of other RPR nodes are unclear as well.

With this method, when all the RPR nodes connected to the node 320 are not allowed to transfer a frame to the node 320, frames might be continuously transferred between these RPR nodes.

It is accordingly necessary to prevent continuous transfer of a frame by, after newly applying a Time To Live (TTL) field to a frame, for example, decrementing a value of the frame by one every time the frame is received at the RPR node, as well as abandoning a frame whose value attains 1 or the like.

At the time of transferring a frame to the node 320, the RPR node 120 and the RPR node 220 delete an applied TTL field.

With the foregoing method, the RPR node 120 and the RPR node 220 need not to notify the port states of the own output ports 510-3 with each other, so that the need of the port state management data base management unit 490 of both the RPR nodes is eliminated to simplify the structure of the RPR node.

As described in the foregoing, by distributing and transferring a frame received from the node 300 to the RPR network 10 and the RPR network 20 by the link selection unit 410 of the RPR node 100, a transmission capacity between the node 300 and the node 320 can be expanded.

Forming a communication system by combining a plurality of RPR networks whose transmission capacities are different and then distributing traffic to each RPR network by using the same method enables a communication system having a desired transmission capacity to be set up with ease and at low costs.

(Operation of Frame Transfer in Abnormal State)

Figure 11:
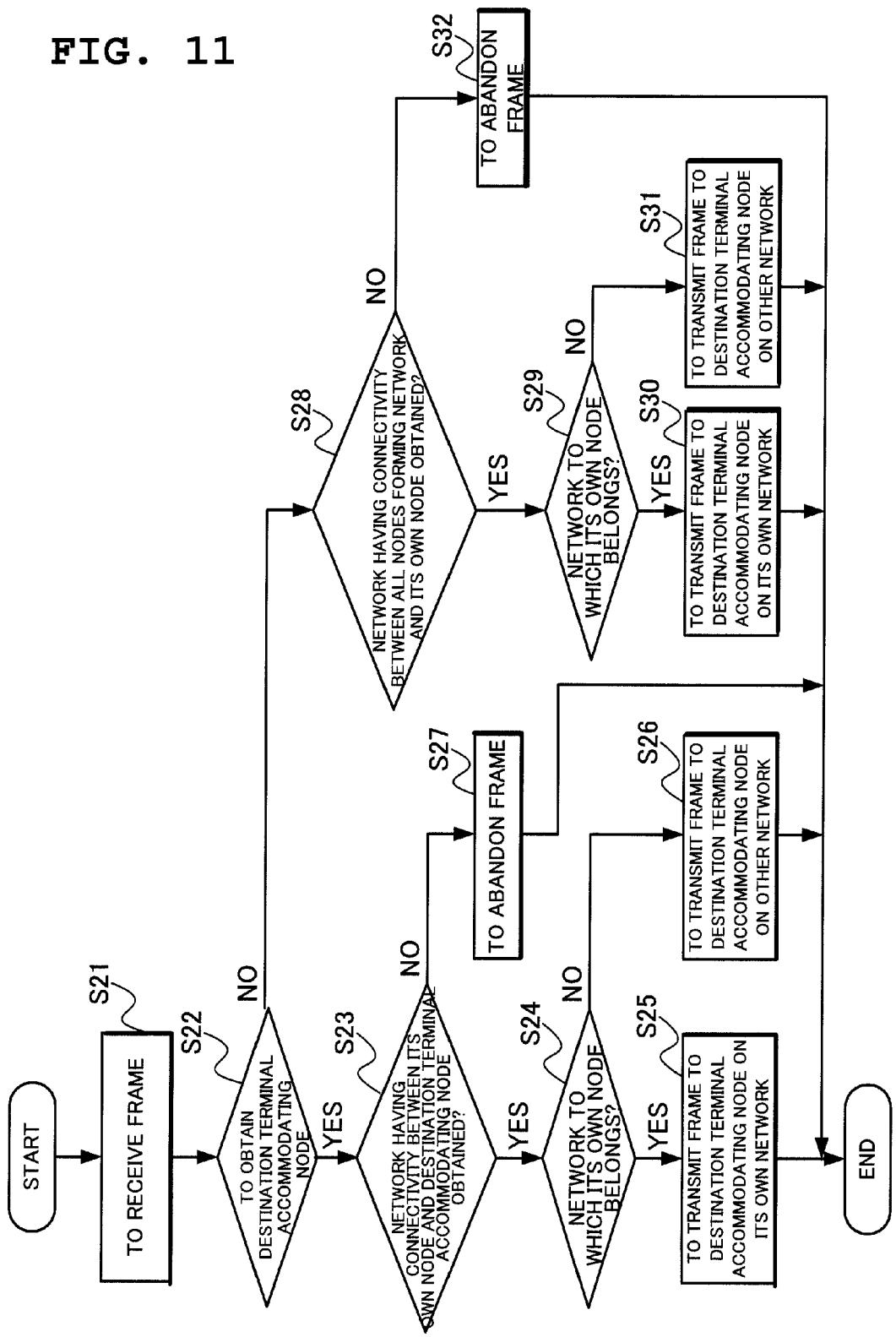
FIG. 11 is a flow chart showing operation of the RPR node according to the first exemplary embodiment.

In the following, description will be made of operation of transferring a frame from the node 300 to the node 320 when such abnormality as link cut-off or a failure of the RPR node occurs in either one or both of the RPR network 10 and the RPR network 20 with reference to the flow chart shown in FIG. 11.

In a case where even when abnormality occurs in the RPR network 10 or the RPR network 20, communication is possible between all the RPR nodes forming the RPR network 10 (having connectivity) and communication is possible between all the RPR nodes forming the RPR network 20 (having connectivity), frame distribution to the RPR network 10 and the RPR network 20 is similarly enabled by the same manner as that of the method described with respect to the frame transfer operation in the normal state.

The reason is that even when a link between the RPR node 100 and the RPR node 110 is cut off in the RPR network 10, for example, communication between the RPR nodes forming the RPR network 10 is continued because a frame is transferred so as to detour a cut-off part by the RPR failure recovery operation, so that a frame directed to the node 320 is transferred from the node 300 to the node 320 similarly to the normal state.

However, when in either one of the RPR network 10 and the RPR network 20, connectivity between all the RPR nodes is lost due to occurrence of such abnormality as simultaneous cut-off of a plurality of links or down of the RPR node in either or both of the RPR network 10 and the RPR network 20, it is necessary to distribute a frame to the RPR network 10 or the RPR network 20 taking a frame destination and an abnormality occurring part into consideration.

The reason is that even when a frame is distributed to an RPR network having no connectivity with an RPR node which accommodates a terminal as a frame destination, transfer of the frame to the destination is impossible.

In the following, description will be made of operation of transferring an Ethernet (registered trademark) frame from the node 300 to the node 320 when there is no connectivity between all the RPR nodes forming the RPR network in either one or both of the RPR network 10 and the RPR network 20.

Upon receiving an Ethernet (registered trademark) frame from the node 300 at the input port 400-3 of the RPR node 100 (Step S21), the network selection unit 410 of the RPR node 100, with a destination MAC address of the Ethernet (registered trademark) frame as a key, searches the FDB 440 of the RPR node 100 to obtain an RPR node in which a terminal as a destination of the Ethernet (registered trademark) frame is accommodated (Step S22).

When acquisition of the RPR node succeeds, the network selection unit 410 of the RPR node 100 refers to the TDB 450 of the RPR node to obtain an RPR network having connectivity with its own RPR node (RPR node 100) and the obtained RPR node (Step S23).

When the obtained RPR network is the RPR network 10 to which the RPR node 100 belongs (Step S24), the network selection unit 410 of the RPR node 100 sends the frame to the switch processing unit 430 of the RPR node 100 (Step S25), when the same is the RPR network 20 to which the RPR node 200 belongs (Step S24), sends the frame from the output port 510-5 of the RPR node 100 to the RPR node 200 (Step S26), when the same are both the RPR network 10 and the RPR network 20, distributes the frame to either of the RPR network 10 or the RPR network 20 according to the frame distribution algorithm as described with respect to the operation of frame transfer in the normal state or when no RPR network is obtained (Step S23), abandons the frame (Step S27).

When acquisition of the RPR node fails (Step S22), the network selection unit 410 of the RPR node 100 refers to the TDB 450 of the RPR node 100 to obtain an RPR network having connectivity between all the RPR nodes forming the RPR network and its own RPR node (Step S28).

When the obtained RPR network is the RPR network 10 to which the RPR node 100 belongs (Step S29), the network selection unit 410 of the RPR node 100 sends the frame to the switch processing unit 430 of the RPR node 100 (Step S30), when the same is the RPR network 20 to which the RPR node 200 belongs (Step S29), sends the frame to the RPR node 200 through the output port 510-5 of the RPR node 100 (Step S31), when the same are both the RPR network 10 and the RPR network 20, distributes the frame to either one of the RPR network 10 and the RPR network 20 according to the frame distribution algorithm which has been described with respect to the frame transfer operation in the normal state or when no RPR network is obtained (Step S28), abandons the frame (Step S32).

Although the foregoing has been described with respect to the method of transmitting a unicast frame directed to the node 320 from the node 300, a method of transmitting a broadcast frame or a multicast frame is the same as the method of broadcast-transferring a unicast frame when the above-described RPR node acquisition fails.

As described in the foregoing, since a frame is distributed to an RPR network having connectivity with a destination node of the frame by referring to the FDB 440 and the TDB 450 of the RPR node 100 by the network selection unit 410 of the RPR node 100 also in the abnormal state, continuous transfer of a frame to a destination terminal is enabled.

(Coping with Multi-Failure)

In the following, description will be made of a method of transferring an unknown unicast frame, a broadcast frame and a multicast frame (hereinafter, these frames will be described in the lump as a broadcast frame) when in both of the RPR network 10 and the RPR network 20, there exists no connectivity between all the RPR nodes forming the RPR network.

With the frame transfer method described with respect to the operation of frame transfer in the abnormal state, when there exists no connectivity between all the RPR nodes forming the RPR network 10, that is, among the RPR nodes 100~130, communication between arbitrary RPR nodes is cut off and there exists no connectivity between all the RPR nodes forming the RPR network 20 (hereinafter, such abnormality will be described as a multi-failure), broadcast frames transmitted from the nodes 300~330 to the RPR nodes 100~130 and the RPR nodes 200~230 are abandoned because no RPR network for transferring a frame can be obtained by the network selection units 410 of the RPR nodes 100~130 and the RPR nodes 200~230.

In the following, description will be made of a method of transferring a broadcast frame to as many terminals as possible also in such abnormal state as described above.

One method is fixing an RPR network to which a broadcast frame is to be transferred at the time of a multi-failure to either the RPR network 10 or the RPR network 20.

When the link selection unit 410 of the RPR node 100 detects a multi-failure by the TDB 450 of the RPR node 100, for example, an RPR network with the largest number of RPR nodes having connectivity is selected as an RPR network to which a broadcast frame is to be transferred.

Hereafter, the link selection unit 410 of the RPR node 100 will always distribute a frame to the RPR network when transferring a broadcast frame.

With this method, it is as a matter of course impossible to transfer a broadcast frame to an RPR node having connectivity only in an RPR network not selected as the RPR network to which a broadcast frame is to be transferred.

Among other methods of transferring a broadcast frame at the time of a multi-failure is a method in which an RPR node on the transmission side broadcast-transfers a broadcast frame to all the RPR networks forming the communication system and an RPR node on the reception side receives only a broadcast frame only in a specific RPR network and abandons a broadcast frame received in other RPR networks.

In the following, detailed description will be made of operation of the method with respect to a case where the RPR node 100 transfers a broadcast frame received from the node 300 at the time of a multi-failure.

Upon receiving a broadcast frame at the input port 400-3 of the RPR node 100 from the node 300, the RPR node 100 sends the frame to the network selection unit 410 of the RPR node 100.

When a destination MAC address of the frame is a broadcast MAC address or a multicast MAC address or when determining that the frame is an unknown unicast frame as a result of reference to the FDB 440 of the RPR node 100, the network selection unit 410 of the RPR node 100 transmits the frame. In other words, the unit sends the frame to the frame multiplexing unit 420 of the RPR node 100, as well as sending the frame also to the RPR node 200 from the output port 510-5 of the RPR node 100.

After multiplexing the broadcast frame from the network selection unit 410 of the RPR node 100 and a frame from the input port 400-5 of the RPR node 100, the frame multiplexing unit 420 of the RPR node 100 sends the result to the switch processing unit 430 of the RPR node 100.

The switch processing unit 430 of the RPR node 100 broadcast-transfers the broadcast frame from the network selection unit 410 of the RPR node 100 to the RPR network 10.

The RPR node 200 sends the broadcast frame transmitted from the output port 510-5 of the RPR node 100 and received at the input port 400-5 of the RPR node 200 to the switch processing unit 430 of the RPR 200 through the frame multiplexing unit 420 of the RPR node 200 and then broadcast-transfers the frame to the RPR network 20.

Among the broadcast frames transferred from the RPR node 100 to the RPR node 200, as to an unknown unicast frame, because the switch processing unit 430 of the RPR node 200 might determine that the frame is not an unknown unicast frame but a unicast frame to unicast-transfer the frame to the RPR network 20, the RPR node 100 needs to notify to the RPR node 200 that a frame to be transferred to the RPR node 200 is an unknown unicast frame.

Among possible as this method is a method of transferring a frame with a bit indicative of an unknown unicast frame added to a header or transferring an RPR frame to the RPR node 200 after generating the RPR frame with a broadcast MAC address stored as a destination MAC address and an unknown unicast frame stored in the payload.

As other methods than those descried above, such method can be used as of meeting the contents of the FDB 440 of the RPR node 100 with the FDB 440 of the RPR node 200 or integrating the FDB 440 of the RPR node 100 and the FDB 440 of the RPR node 200 to make the switch processing unit 430 of the RPR node 100 and the switch processing unit 430 of the RPR node 200 refer to the same FDB 440.

The broadcast frame which have been broadcast-transferred to both the RPR network 10 and the RPR network 20 are received by the RPR nodes 110~130 and the RPR nodes 210~230 by the following manner.

Figure 12:
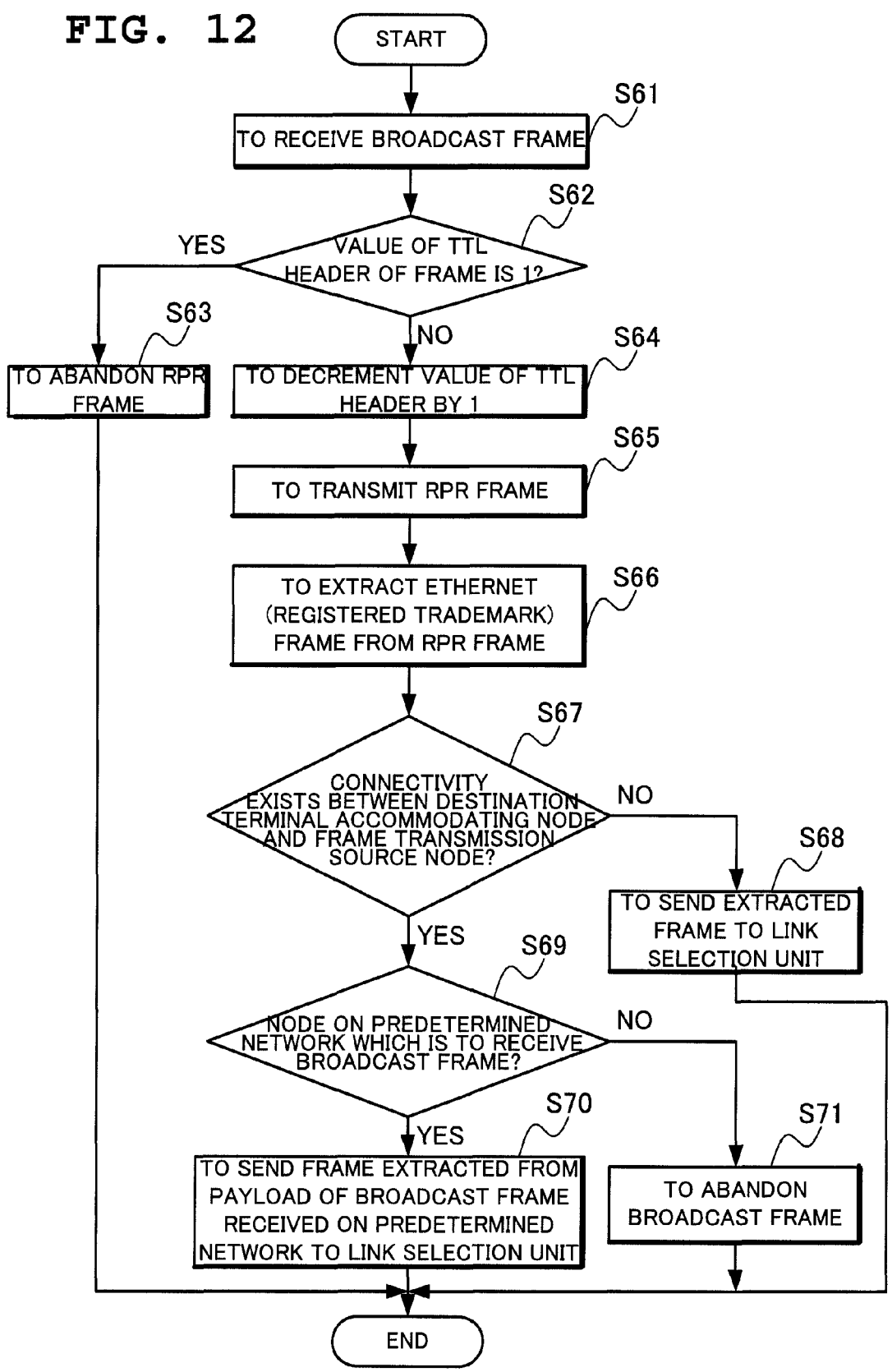
FIG. 12 is a flow chart showing operation of the RPR node according to the first exemplary embodiment.

Although description will be made in the following with respect to operation executed when the RPR node 120 receives a broadcast frame at the input port 400-1 of the RPR node 120 at the time of a multi-failure with reference to the flow chart shown in FIG. 12, this is also the case with operation executed when other RPR node receives a broadcast frame at the time of a multi-failure.

Upon receiving an RPR frame with a broadcast MAC address stored in the destination MAC address at the input port 400-1 of the RPR node 120 (Step S61), the RPR node 120 sends the RPR frame to the switch processing unit 430 of the RPR node 120.

The switch processing unit 430 of the RPR node 120 abandons the RPR frame (Step S63) when the value stored in the TTL header of the RPR frame is 1 (Step S62).

When the value stored in the TTL header of the RPR frame is not 1, the switch processing unit 430 of the RPR node 120 decrements the value stored in the TTL header of the RPR frame by one (Step S64) and then transmits the RPR frame through the output port 510-2 (Step S65), as well as extracting an Ethernet (registered trademark) frame stored in the payload of the RPR frame (Step S66).

When the connectivity between the RPR node 120 and the RPR node (RPR node 100) corresponding to the MAC address stored in the transmission source MAC address of the RPR frame is lost in other RPR network (RPR network 20) than the RPR network 10 (Step S67), the switch processing unit 430 of the RPR node 120 sends the extracted Ethernet (registered trademark) frame to the link selection unit 407 of the RPR node 120 (Step S68).

When connectivity between the RPR node 120 and the RPR node 100 exists in both the RPR network 10 and the RPR network 20 (Step S67), with an RPR network for receiving a broadcast frame determined in advance (Step S69), transmit a frame extracted from the payload of the broadcast frame received by either one of the RPR networks to the link selection unit 470 (Step S70) and abandon a broadcast frame received by the other RPR network (Step S71).

When determination is made in advance to receive a frame by the RPR network 10, for example, the switch processing unit 430 of the RPR node 120 sends the extracted frame to the link selection unit 470 of the RPR node 120 and when determination is made in advance to receive a frame by the RPR network 20, the switch processing unit 430 of the RPR node 120 abandons the extracted frame.

As a result of the foregoing, while receiving only a broadcast frame transferred to either one of the RPR networks among broadcast frames transferred to both the RPR network 10 and the RPR network 20, the RPR node 120 abandons a broadcast frame received at the other to prevent a plurality of receptions of broadcast frames.

The foregoing described method enables transfer of a broadcast frame to as many terminals as possible even when a multi-failure occurs.

(Effects of the First Exemplary Embodiment)

According to the present exemplary embodiment, effects set forth in the following can be attained.

First, a transmission capacity of a communication system can be expanded in the normal state.

The reason is that the network selection unit 410 of the RPR node 100 distributes and transfers a frame received from the node 300 to the RPR network 10 and the RPR network 20.

Secondly, a communication system having a desired transmission capacity can be set up with ease.

The reason is that after forming a communication system by combining a plurality of arbitrary RPR networks having different transmission capacities, traffic is distributed to each RPR network by using the same method as described above.

Thirdly, a new communication system set-up cost can be suppressed.

The reason is that a new communication system can be set up using an existing network which has been used so far.

Fourthly, continuous communication is enabled even in the abnormal state.

The reason is that because the network selection unit 410 of the RPR node 100 refers to the FDB 440 and the TDB 450 of the RPR node 100 to distribute a frame to an RPR network having connectivity with a destination node of the frame, detouring an abnormal part enables frame transfer to a destination terminal even in the abnormal state.

Fifthly, a highly reliably communication system can be set up.

The reason is that a link between a node and a terminal, and between nodes on different networks are made redundant.

Second Exemplary Embodiment

In the following, a communication system according to a second exemplary embodiment of the present invention will be described with reference to the drawings.

(Structure of Communication System)

Figure 13:
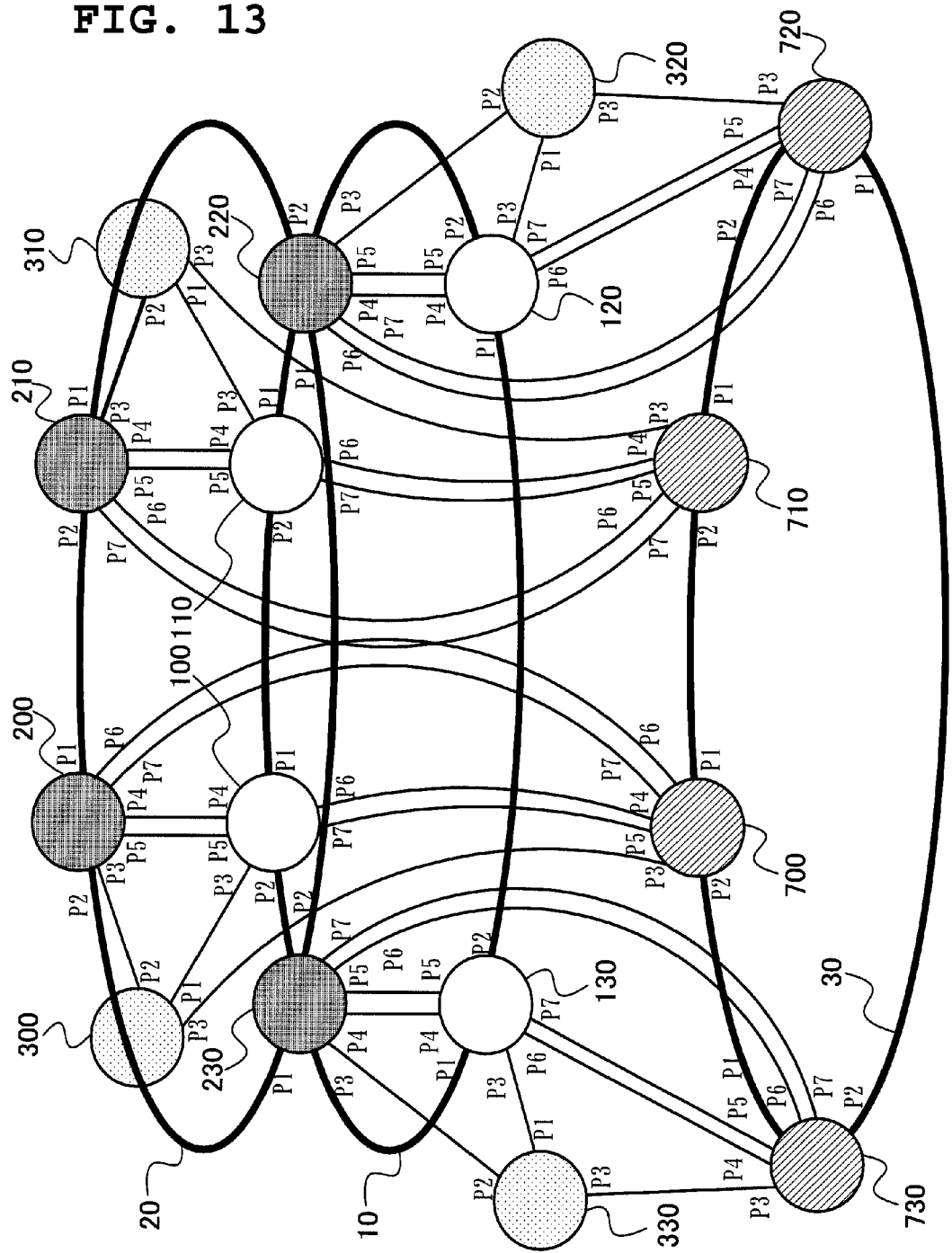
FIG. 13 is a schematic diagram showing an example of a structure of a communication system to which a second exemplary embodiment is applied.

FIG. 13 is a schematic diagram showing an example of a structure of the communication system according to the second exemplary embodiment to which the present invention is applied.

As shown in FIG. 13, the present exemplary embodiment corresponds to the first exemplary embodiment shown in FIG. 1 and adopts the same basic structure as that of the first exemplary embodiment, which differs from the communication system according to the first exemplary embodiment in that an RPR network 30 comprising RPR nodes 700~730 is added to connect the three RPR networks with each other.

In the following, description will be made mainly of the difference from the above-described first exemplary embodiment and description of components common to those of the first exemplary embodiment will be appropriately omitted.

A communication system having four or more RPR networks will have the same structure.

For setting up a communication system with three or more RPR networks, first prepare a plurality of RPR networks formed of RPR nodes.

Next, select one RPR node from each RPR network so as not to overlap with each other and make as many combinations as the number of RPR nodes forming an RPR network.

In other words, the nodes are connected such that two or more RPR nodes on the same RPR network fail to belong to the same combination described above.

Connect RPR nodes in mesh included in each combination.

At this time, even if the nodes are not connected physically in mesh, connecting them logically in mesh by using a packet switch obtains advantages that the number of links can be reduced, that the number of memory buffers necessary for multiplexing a frame can be reduced, and the like.

Further connect a node of a terminal to a part or all of RPR nodes included in each combination.

As to the number of RPR nodes on the RPR network, it may not be the same for each RPR network.

Figure 14:
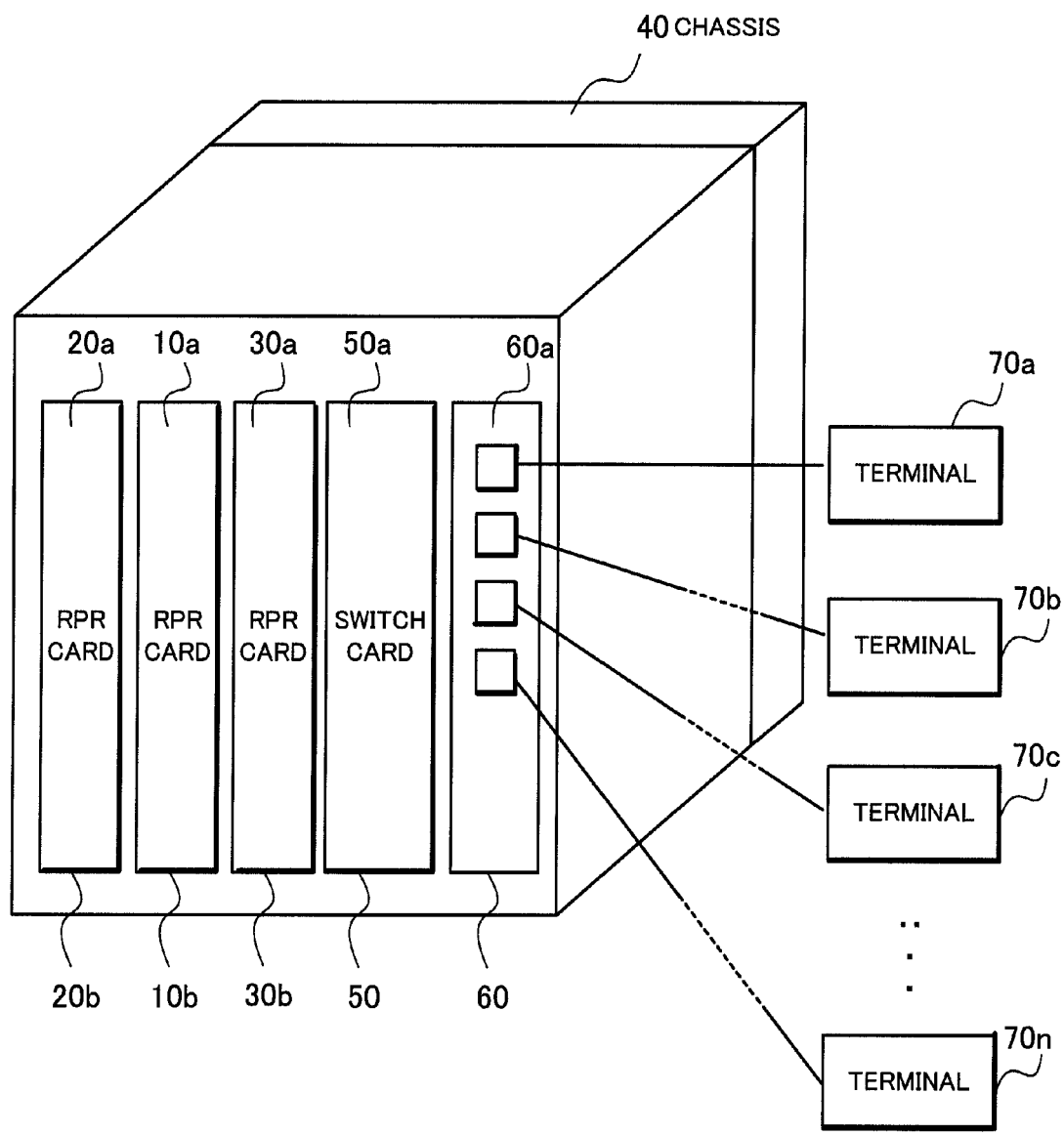
FIG. 14 is a diagram showing an external appearance of a communication device forming the communication system to which the second exemplary embodiment is applied.
Figure 15:
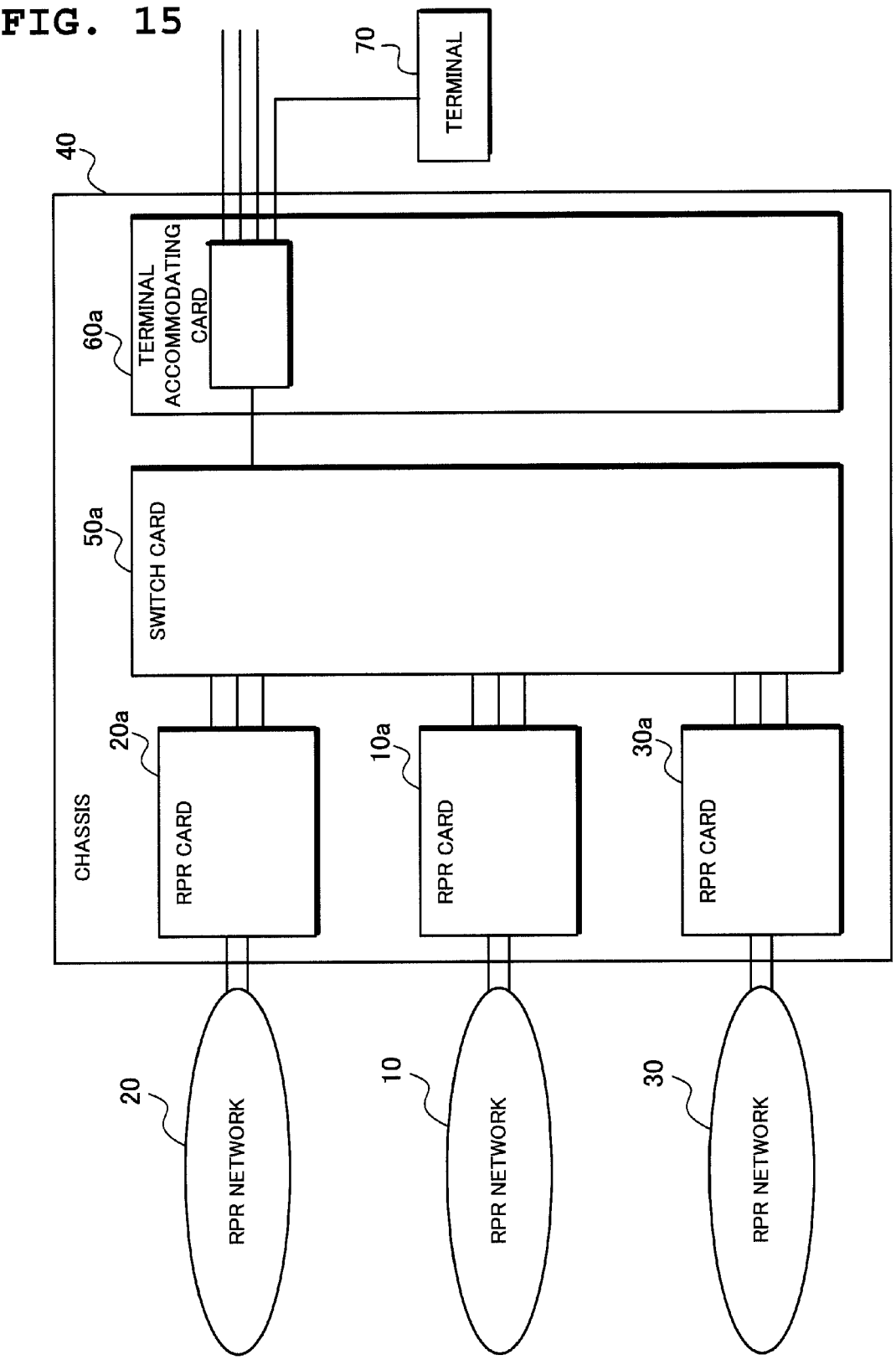
FIG. 15 is a block diagram showing an internal structure of the communication device forming the communication system in the second exemplary embodiment.

FIG. 14 and FIG. 15 show an example of a communication device for forming the communication system according to the second exemplary embodiment to which the present invention is applied.

FIG. 14 is a schematic diagram showing an external appearance of the communication device forming the communication system according to the present exemplary embodiment. FIG. 15 is a block diagram showing an internal structure of the communication device.

With reference to FIG. 14, the communication device of the communication system to which the present invention is applied is structured to have RPR card insertion units 10b, 20b and 30b for inserting RPR cards 10a, 20a and 30a, a switch unit 50 for inserting a switch card 50a, and a client accommodation card 60a which are provided in a chassis 40, with clients 70a, 70b and 70c, . . . 70n connected to connection terminals of the client accommodation card 60a.

With reference to FIG. 15, the RPR cards 10a, 20a and 30a correspond to such node as the RPR node 100 in the first exemplary embodiment and insertion thereof into the RPR card insertion units 10b, 20b and 30b allows them to function as a node on the RPR network 10, the RPR network 20 and the RPR network 30, respectively.

The switch card 50a has a function of transferring a frame between the RPR cards 10a, 20a and 30a inserted into the RPR card insertion units 10b, 20b and 30b, and between the clients 70a, 70b, 70c, . . . , 70n connected to the client accommodation card 60a through the client connection terminals and the RPR cards 10a, 20a and 30a.

The clients 70a~70n are terminals which correspond to the nodes 300~330 or the like in the first exemplary embodiment. The clients 70a~70n may have a function of setting a transfer condition for transferring a frame in response to a function of the switch card 50a for transferring a frame.

(Structure of Node)

Figure 16:
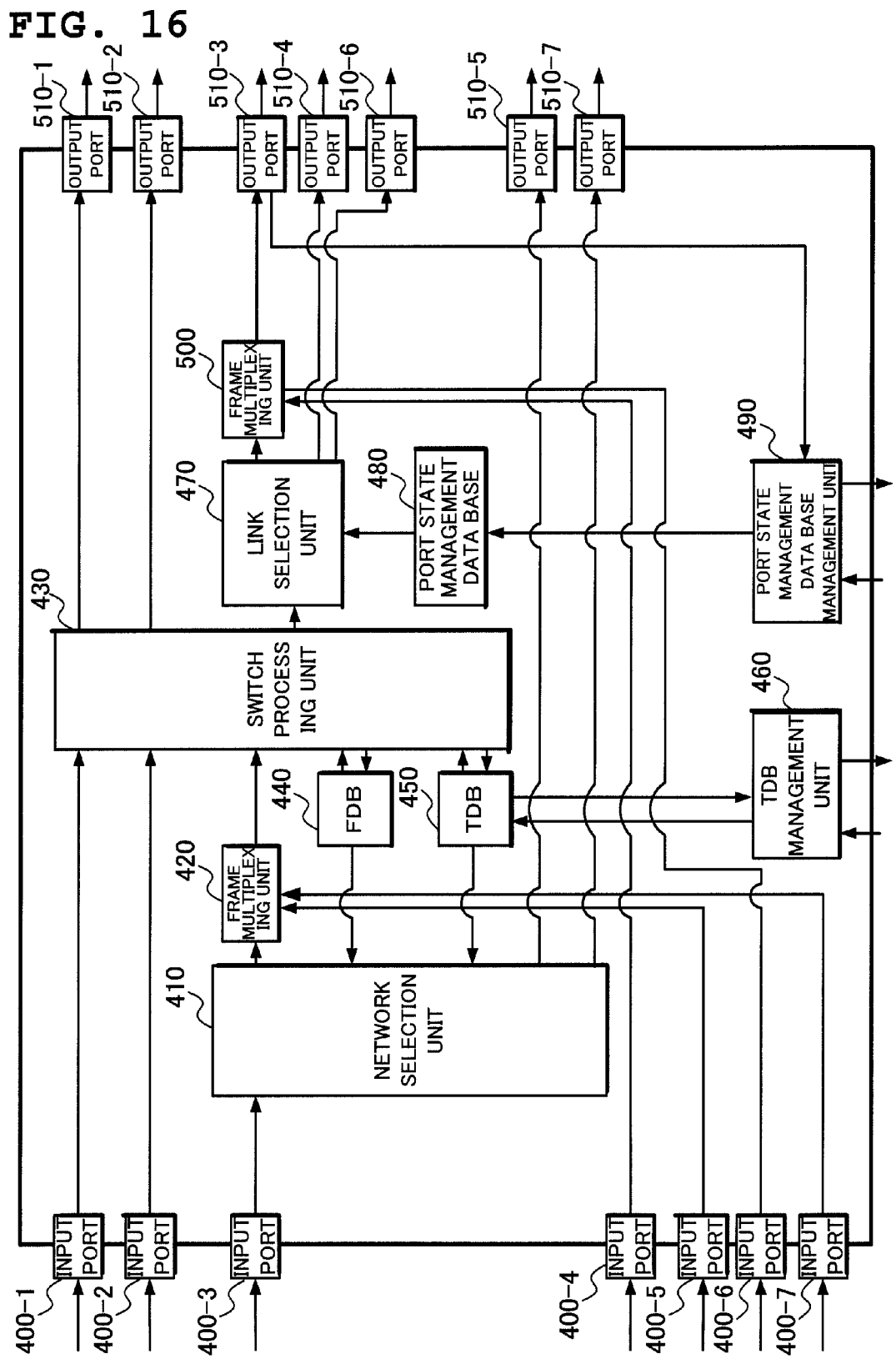
FIG. 16 is a block diagram showing a structure of RPR nodes 100~130, RPR nodes 200~230 and RPR nodes 700~730 in the communication system according to the second exemplary embodiment.

FIG. 16 is a block diagram showing a structure of the RPR nodes 100~130, the RPR nodes 200~230 and the RPR nodes 700~730 in the communication system according to the second exemplary embodiment.

While description will be made of the structure of the RPR node 700 in the following, the structure of the RPR nodes 710~730, the RPR nodes 100~130 and the RPR nodes 200~230 is the same as that of the RPR node 700.

Although the RPR node 700 according to the second exemplary embodiment has the same basic structure as that of the RPR node 100 according to the first exemplary embodiment, it differs from the RPR node 100 according to the first exemplary embodiment in that input ports 400-6 and 400-7 and output ports 510-6 and 510-7 are added.

The input ports 400-6 and 400-7 have the same function as that of the input ports 400-4 and 400-5 and the output ports 510-6 and 510-7 have the same function as that of the output ports 510-4 and 510-5, respectively.

Although each data base and table that the RPR node 700 has in other structure are the same as those of the RPR node 100 according to the first exemplary embodiment, data contents thereof differ in having an RPR network, an RPR node and input and output ports added.

Shown in FIG. 17 as one example of a table whose data contents differ is a network connection information table 4501 in the second exemplary embodiment.

FIG. 17 is a diagram showing to which node of the RPR networks 10 and 20 as other networks each port of the RPR node 700 on the RPR network 30 connects, with a port number and node information for identifying a node connected to each port (node number and MAC address) as components.

With reference to FIG. 17, represented is that the RPR node 700 is connected at the port P4 and the port P5 to the RPR node 100 denoted, for example, as a MAC address yy:yy:yy:yy and at the port P6 and P7 to the RPR node 200 denoted, for example, as a MAC address xx:xx:xx:xx.

Since to the operation of transferring traffic in a communication system formed of three RPR networks according to the present exemplary embodiment, the operation of transferring traffic in the above-described communication system according to the first exemplary embodiment is applicable, no description will be made thereof.

(Effects of the Second Exemplary Embodiment)

The present exemplary embodiment attains such effects as set forth below similarly to the first exemplary embodiment.

More specifically, having the same structure as that of the first exemplary embodiment, the present exemplary embodiment enables a transmission capacity of the communication system to be expanded in both the normal state and the abnormal state and also enables a communication system having a desired transmission capacity to be set up with ease, and further enables a new communication system set-up costs to be suppressed and enables a highly reliable communication system to be set up.

Third Exemplary Embodiment

In the following, a communication system according to a third exemplary embodiment of the present invention will be described with reference to the drawings.

(Structure of Communication System)

Although the present exemplary embodiment corresponds to the second exemplary embodiment and adopts the same basic structure as that of the second exemplary embodiment, it differs from the second exemplary embodiment in that three RPR networks forming the communication system according to the second exemplary embodiment are the RPR network 10, a network (not shown) using the Ethernet (registered trademark) technique and a network (not shown) using the GOE (Global Optical Ethernet (registered trademark)) technique.

GOE network is a network in which an edge node to which a transmission source terminal is connected adds an ID of an edge node to which a transmission destination terminal is connected or the like to a transmission packet, and the packet is transferred within a core network according to the ID (see Japanese Patent Laying-Open No. 2004-140776 (Literature 3) for more details).

In the following, description will be mainly made of the difference from the above-described second exemplary embodiment and that of components common to those of the second exemplary embodiment will be appropriately omitted.

Communication system having four or more networks will have the same structure.

(Structure of Node)

Figure 18:
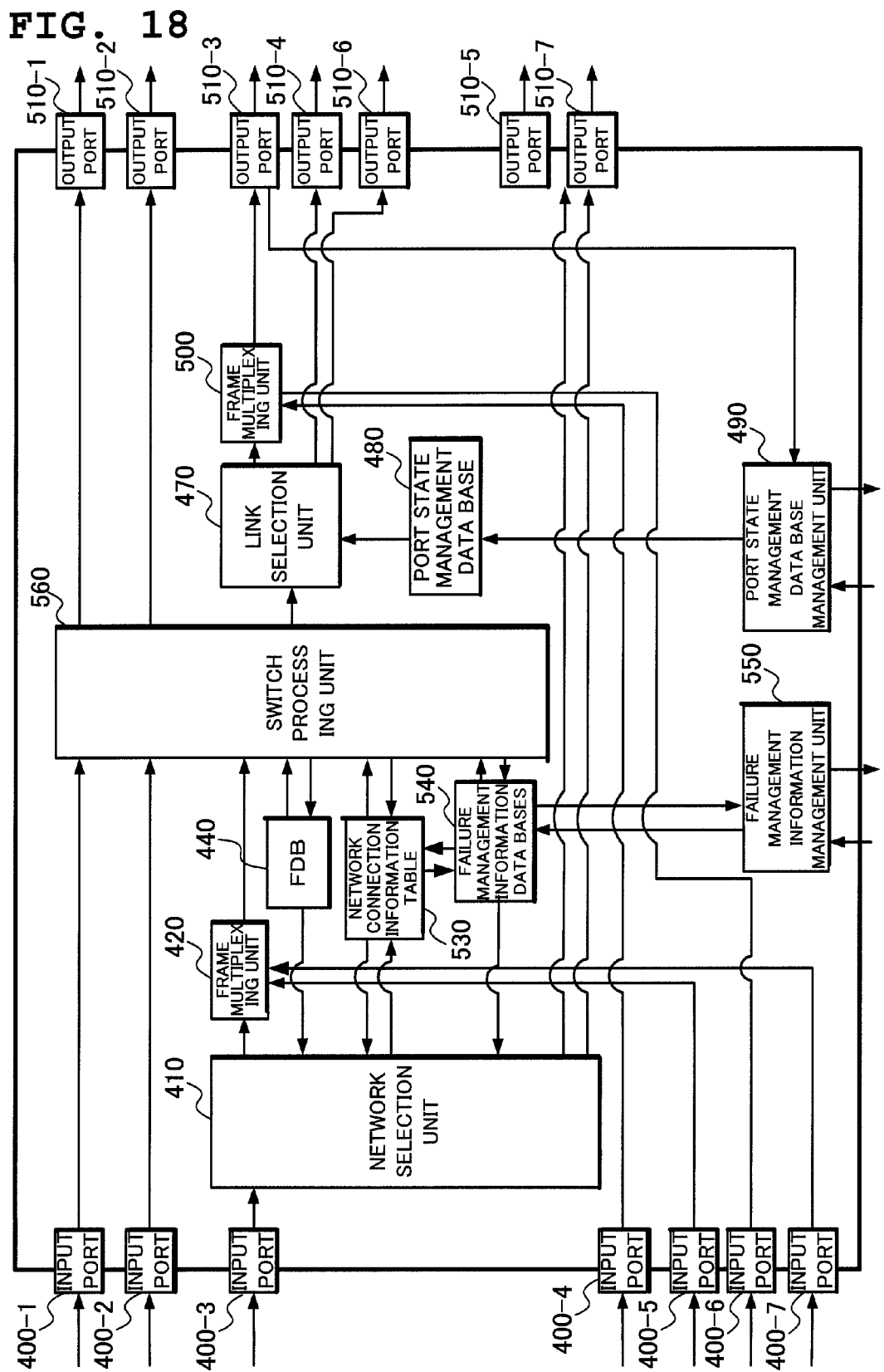
FIG. 18 is a block diagram showing a structure of RPR nodes 200~230 and RPR nodes 700~730 in a communication system according to a third exemplary embodiment.

FIG. 18 is a block diagram showing a structure of an Ethernet (registered trademark) node on a network using the Ethernet (registered trademark) technique and a GOE node on a network using the GOE technique in the communication system according to the third exemplary embodiment.

Although description will be made of the structure of the Ethernet (registered trademark) node in the following, the structure of the GOE node is also the same as the structure of the Ethernet (registered trademark) node.

Although the Ethernet (registered trademark) node according to the third exemplary embodiment has the same basic structure as that of the RPR node 700 according to the second exemplary embodiment, it differs from the RPR node 700 according to the second exemplary embodiment in comprising a switch processing unit 560 in place of the switch processing unit 430, network connection information 530 and failure management information 540 in place of the TDB 450, and a failure management information management unit 550 in place of the TDB management unit 460.

The switch processing unit 560 has the same function as that described above which is used in the present invention among the functions of the switch processing unit 430.

More specifically, since the network using the Ethernet (registered trademark) technique and the network using the GOE technique fail to have a basic function that the RPR network 10 ordinarily has based on RPR, the switch processing unit 560 has such functions as management of a terminal accommodated in each node (learning of a MAC address of a terminal under the control), management of topology information, management of failure management information, dynamic control of a communication band of traffic on the network, management of the network and switching of a frame.

The network connection information 530 stores information about connection with an Ethernet (registered trademark) node on a network using the Ethernet (registered trademark) technique, a GOE node on a network using the GOE technique and an RPR node on an RPR network and has the same network connection information as that of the network connection information tables 4501 and 4502 shown in FIG. 5 and FIG. 6.

The network connection information is formed of a port number of a port that a node has and node information for identifying a node as a connection destination on other network to which the node is connected, which information indicates to which node a port that the node has is connected.

The failure management information 540 is a data base for managing such information as a state of topology and failure occurrence conditions of the network using the Ethernet (registered trademark) technique and the network using the GOE technique, and the network connection information 530.

The failure management information management unit 550 notifies information related to the network using the Ethernet (registered trademark) technique among the information managed by the failure management information 540 to the TDB management unit 460 of the RPR node 100 and the failure management information management unit 550 of the network using the GOE technique, as well as registering information related to the RPR network 10 which is notified by the TDB management unit 460 of the RPR node 100 and the information related to the network using the GOE technique which is notified by the failure management information management unit 550 of the network using the GOE technique.

The failure management information management unit 550, for example, transmits a Keep Alive frame between the nodes and determines a state of a partner, existence/nonexistence of a failure or whether a link is cut off based on arrival/non-arrival of a Keep Alive frame to collect failure information.

As a result of the operation of the failure management information management unit 550, at the failure management information 540 on the network using the Ethernet (registered trademark) technique, information related to topology of both the networks, the RPR network 10 and the network using the GOE technique, and failure information are registered.

Since operation of transferring traffic in the communication system formed of three networks according to the present exemplary embodiment is the same as that of traffic transfer in the above-described communication system according to the second exemplary embodiment, no description will be made thereof.

(Effects of the Third Exemplary Embodiment)

The present exemplary embodiment attains effects set forth below.

More specifically, since the present exemplary embodiment has the same structure as that of the second exemplary embodiment, it has the same effects as those of the second exemplary embodiment even when in the normal state and abnormal state, the networks forming the communication system use different communication protocols.

Fourth Exemplary Embodiment

In the following, a fourth exemplary embodiment of the present invention will be detailed with reference to the drawings.

(Structure of Communication System)

Figure 19:
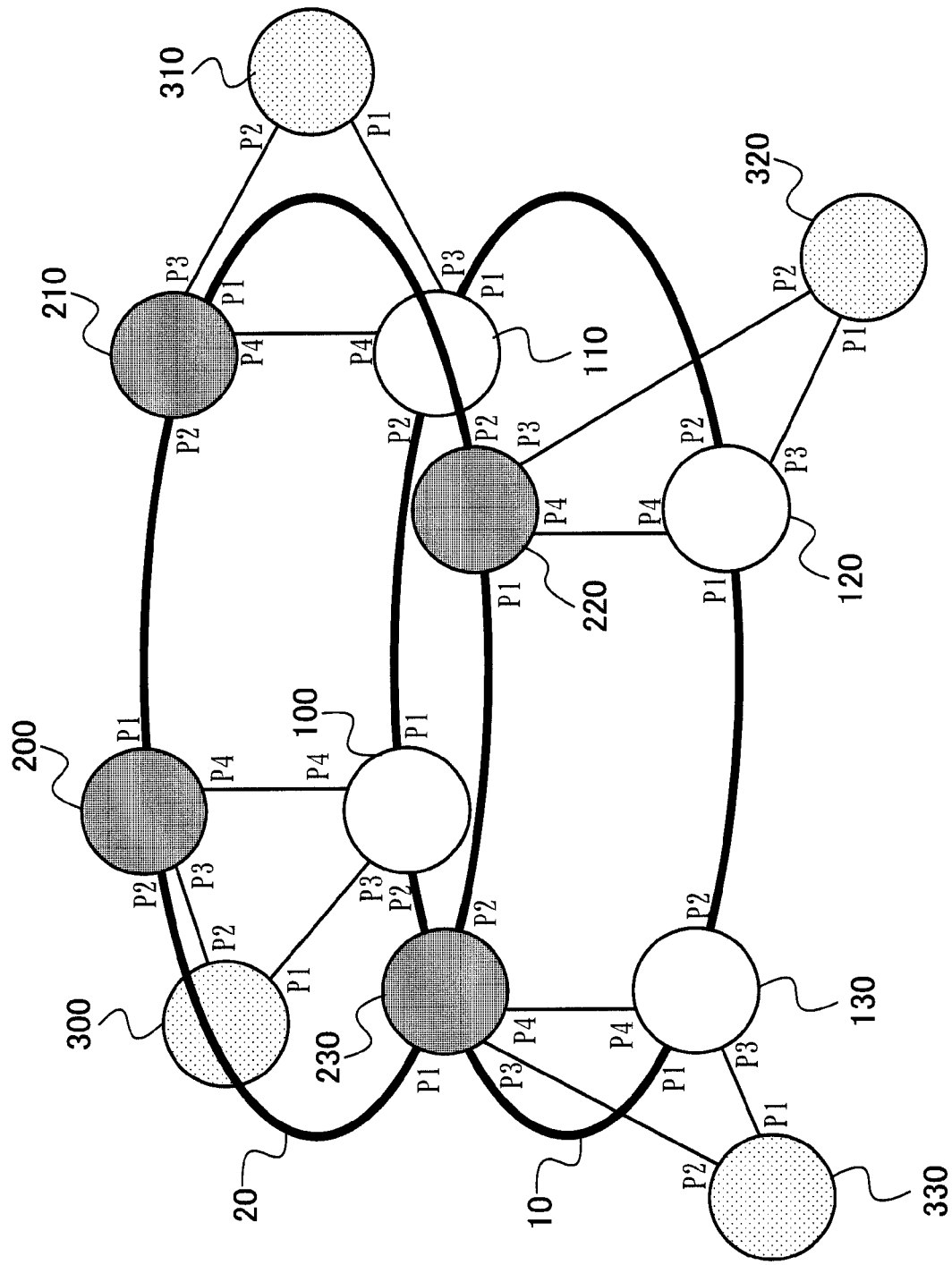
FIG. 19 is a schematic diagram showing a structure of a communication system according to a fourth exemplary embodiment of the present invention.

FIG. 19 is a schematic diagram showing an example of a structure of a communication system to which the present invention is applied.

Figure 20:
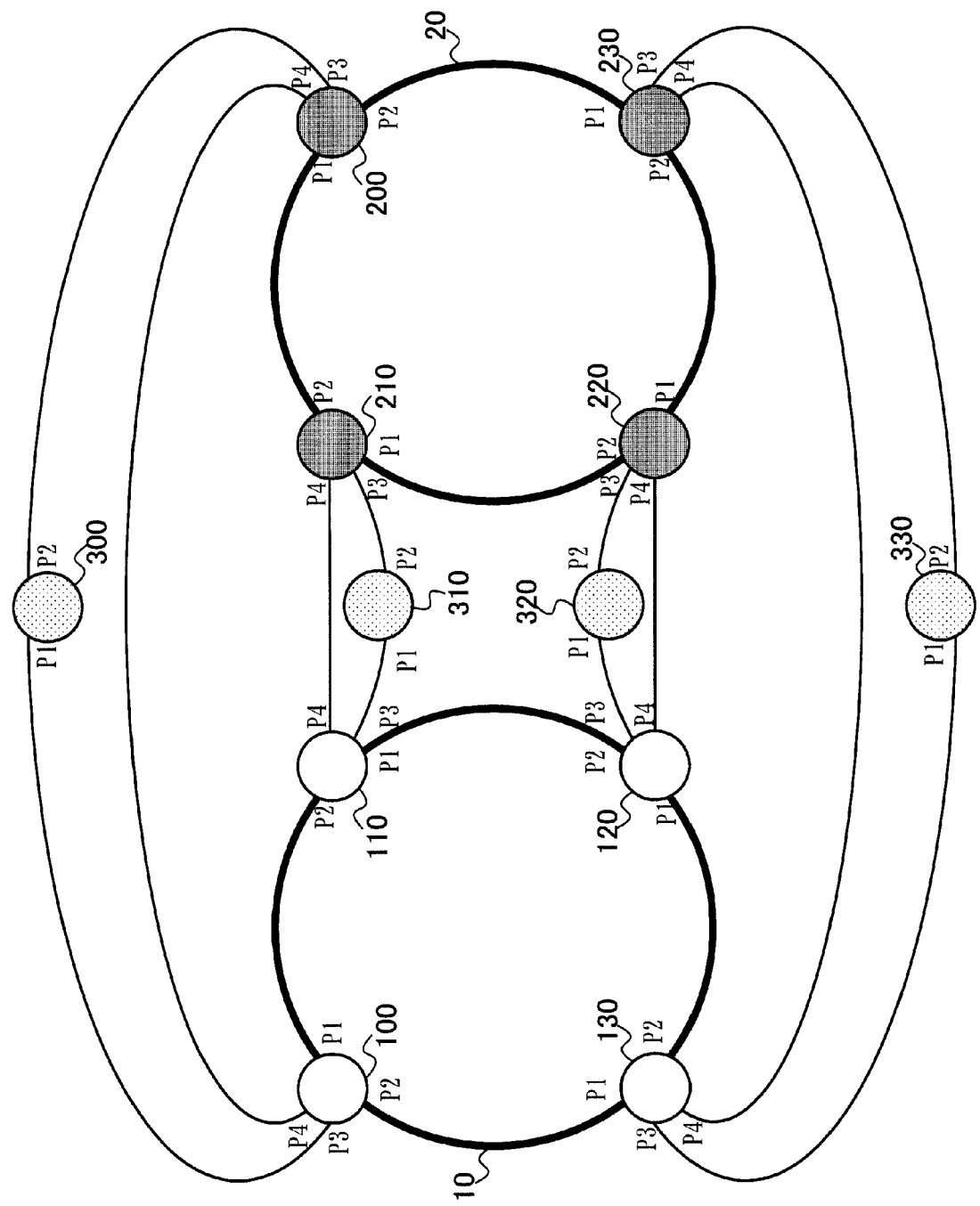
FIG. 20 is a schematic diagram showing a plane structure of the communication system according to the fourth exemplary embodiment.

FIG. 20 is a diagram showing the communication system illustrated in FIG. 19 in plane so as to make connection between the respective nodes be clear in FIG. 19.

Although the structure of the communication system in the fourth exemplary embodiment corresponds to the communication system in the first exemplary embodiment and adopts the same basic structure as that of the communication system in the first exemplary embodiment, it differs from the communication system in the first exemplary embodiment in that there exists one link between the RPR node 100 and the RPR node 200, between the RPR node 110 and the RPR node 210, between the RPR node 120 and the RPR node 220, and between the RPR node 130 and the RPR node 230.

In the following, description will be made mainly of the difference from the above-described first exemplary embodiment and that of components common to those of the first exemplary embodiment will be appropriately omitted.

(Structure of Node)

Figure 21:
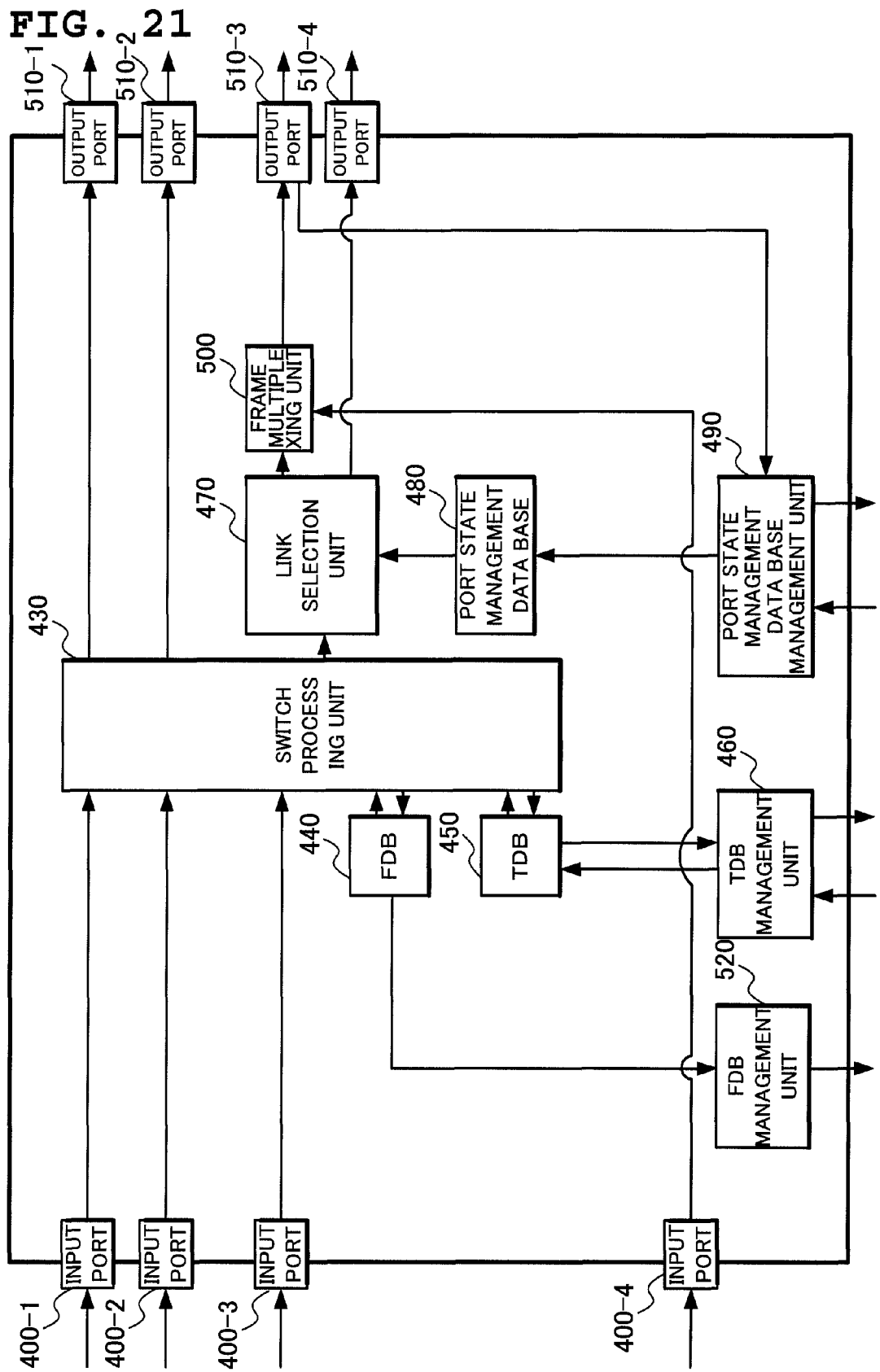
FIG. 21 is a block diagram showing a structure of RPR nodes 100~130 and RPR nodes 200~230 according to the fourth exemplary embodiment.

As shown in FIG. 21, the structure of the RPR node in the fourth exemplary embodiment differs from the structure of the RPR node in the first exemplary embodiment in that the network selection unit 410 and the frame multiplexing unit 420 are unnecessary and that an FDB management unit 520 is newly provided.

Although the following is description of the structure of the RPR node 100 in particular, this is also the case with the structure of the RPR nodes 110~130 and the RPR nodes 200~230.

The FDB management unit 520 of the RPR node 100 notifies the contents of the FDB 440 of the RPR node 100 to an FDB management unit 630 of the node 300 which will be described later.

Figure 22:
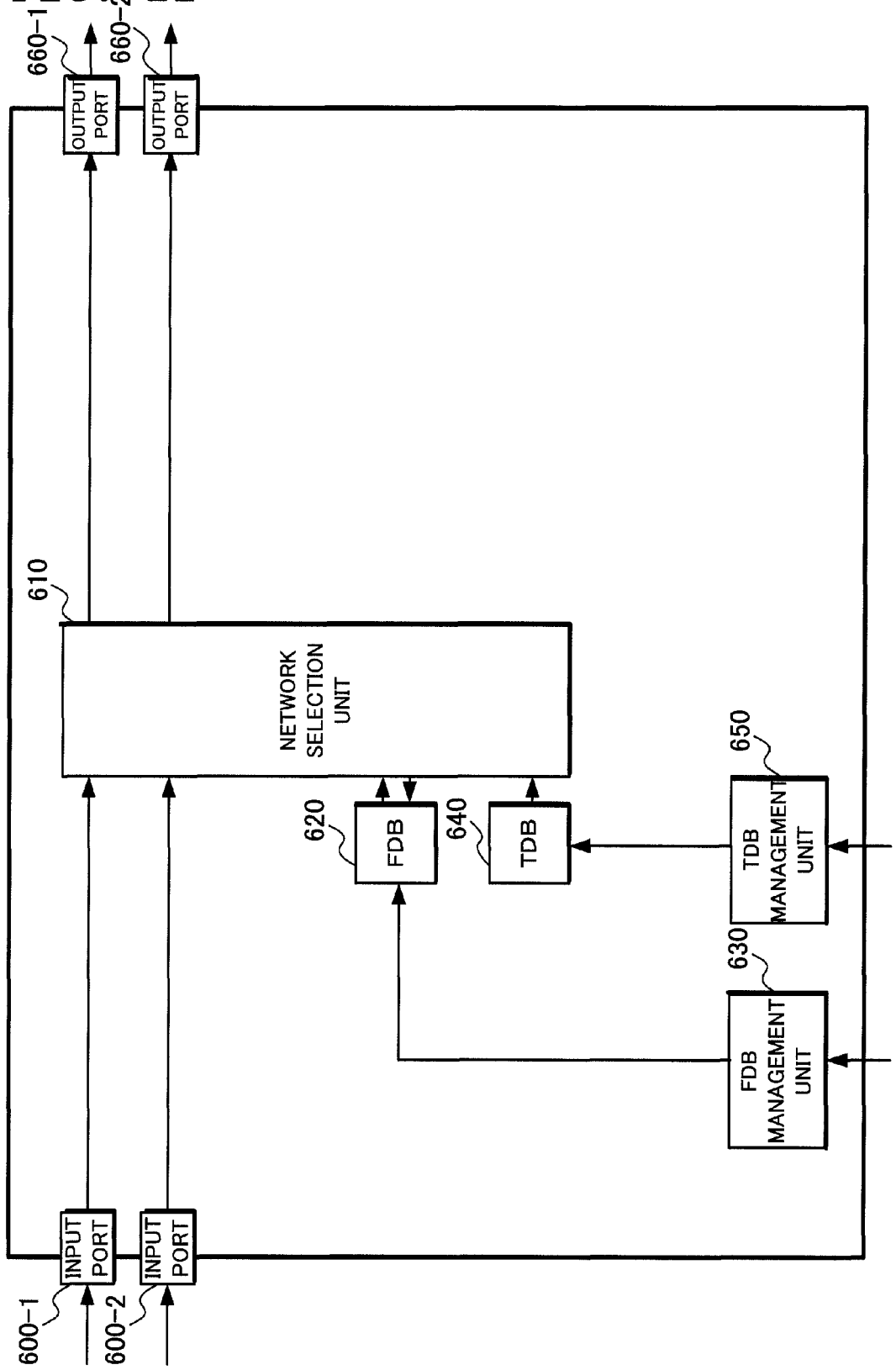
FIG. 22 is a block diagram showing a structure of nodes 300~330 according to the fourth exemplary embodiment.

The nodes 300~330 in the fourth exemplary embodiment have a structure shown in FIG. 22 unlike the nodes 300~330 in the first exemplary embodiment.

In the following, description will be made of the node 300 and this is also the same with the structure of the nodes 310~330.

As shown in FIG. 22, the node 300 comprises input ports 600-1~2, a network selection unit 610, an FDB 620, an FDB management unit 630, a TDB 640, a TDB management unit 650 and output ports 660-1~2.

The input ports 600-1~2 of the node 300, which correspond to the reception side of the ports P1~P2 of the node 300 in FIG. 19, are ports for receiving a frame transmitted from the RPR node 100 or the RPR node 200.

Similarly, the output ports 660-1~2 of the node 300, which correspond to the transmission side of the ports P1~P2 of the node 300 in FIG. 19, are ports for transmitting a frame to the RPR node 100 and the RPR node 200.

The network selection unit 610 of the node 300 refers to the FDB 620 or the TDB 640 of the node 300 to determine whether to transfer a frame from the output port 660-1 through the RPR network 10 or to transfer a frame from the output port 660-2 through the RPR network 20.

The network selection unit 610 of the node 300 may determine a frame transfer destination based on the same transfer condition as that of the first exemplary embodiment.

The FDB 620 of the node 300 is a data base for managing a terminal accommodated in the RPR nodes 100~130 and the RPR nodes 200~230.

The FDB management unit 630 of the node 300 registers the contents of the FDB 440 of the RPR node 100 notified from the FDB management unit 520 of the RPR node 100 and the contents of the FDB 440 of the RPR node 200 notified from the FDB management unit 520 of the RPR node 200 at the FDB 620 of the node 300.

The TDB 640 of the node 300 is a data base for managing such information as a state of topology and a failure occurrence condition of the RPR network 10 and the RPR network 20.

The TDB management unit 650 of the node 300 registers information related to topology of the RPR network 10 notified from the TDB management unit 460 of the RPR node 100 and information related to topology of the RPR network 20 notified from the TDB management unit 460 of the RPR node 200 at the TDB 640 of the node 300.

As described in the foregoing, the fourth exemplary embodiment has such changes as provision of the network selection unit 410, which is provided in the RPR node in the first exemplary embodiment, in the nodes 300~330 and provision of the FDB 440 and the TDB 450, which are provided in the RPR node in the first exemplary embodiment, also in the nodes 300~330 and has the FDB management unit 520 arranged in the RPR node and also the FDB management unit 630 and the TDB management unit 650 arranged in the nodes 300~330 for notifying the contents of the FDB 440 and the TDB 450 of the RPR node to the FDB 440 and the TDB 450 of the nodes 300~330.

(Operation of Frame Transfer in Normal State)

In the following, description will be made of operation of transferring a frame from the node 300 to the node 320 in FIG. 19 in the normal state with reference to the flow chart shown in FIG. 23.

In the first exemplary embodiment, when transmitting a frame directed to the node 320, the node 300 transmits a frame from either one of the ports P1 and P2 of the node 300.

In the fourth exemplary embodiment, when transmitting a frame directed to the node 320, the node 300 first registers the contents of the FDB 440 and the TDB 450 of the RPR node which accommodates the node 300 itself at the FDB 620 and the TDB 630 of its own node (Step S81) and after the node 300 sends the frame to the network selection unit 610 of the node 300, the network selection unit 610 of the node 300 refers to the FDB 620 and the TDB 630 (Step S82) to determine an output port through which the frame is to be transmitted (Step S83).

The network selection unit 610 of the node 300 transmits the frame from either one of the output port 660-1 and the output port 660-2 according to the frame distribution algorithm which has been described with respect to the frame transfer operation in the normal state in the first exemplary embodiment (Step S84).

When the node 300 transmits the frame from the output port 660-1 of the node 330, the frame is sent to the RPR network 10 by the RPR node 100 and then transferred to the node 320 through the node 120.

On the other hand, when the node 300 transmits the frame from the output port 660-2 of the node 330, the frame is sent to the RPR network 20 by the RPR node 200 and then transferred to the node 320 through the node 220.

In other words, while in the first exemplary embodiment, the RPR nodes 100~130 and the RPR nodes 200~230 distribute a frame to either one of the RPR network 10 and the RPR network 20, in the present exemplary embodiment, the nodes 300~330 distribute a frame to each RPR network at a time of transmitting a frame to the RPR nodes 100~130 or the RPR nodes 200~230.

Figure 24:
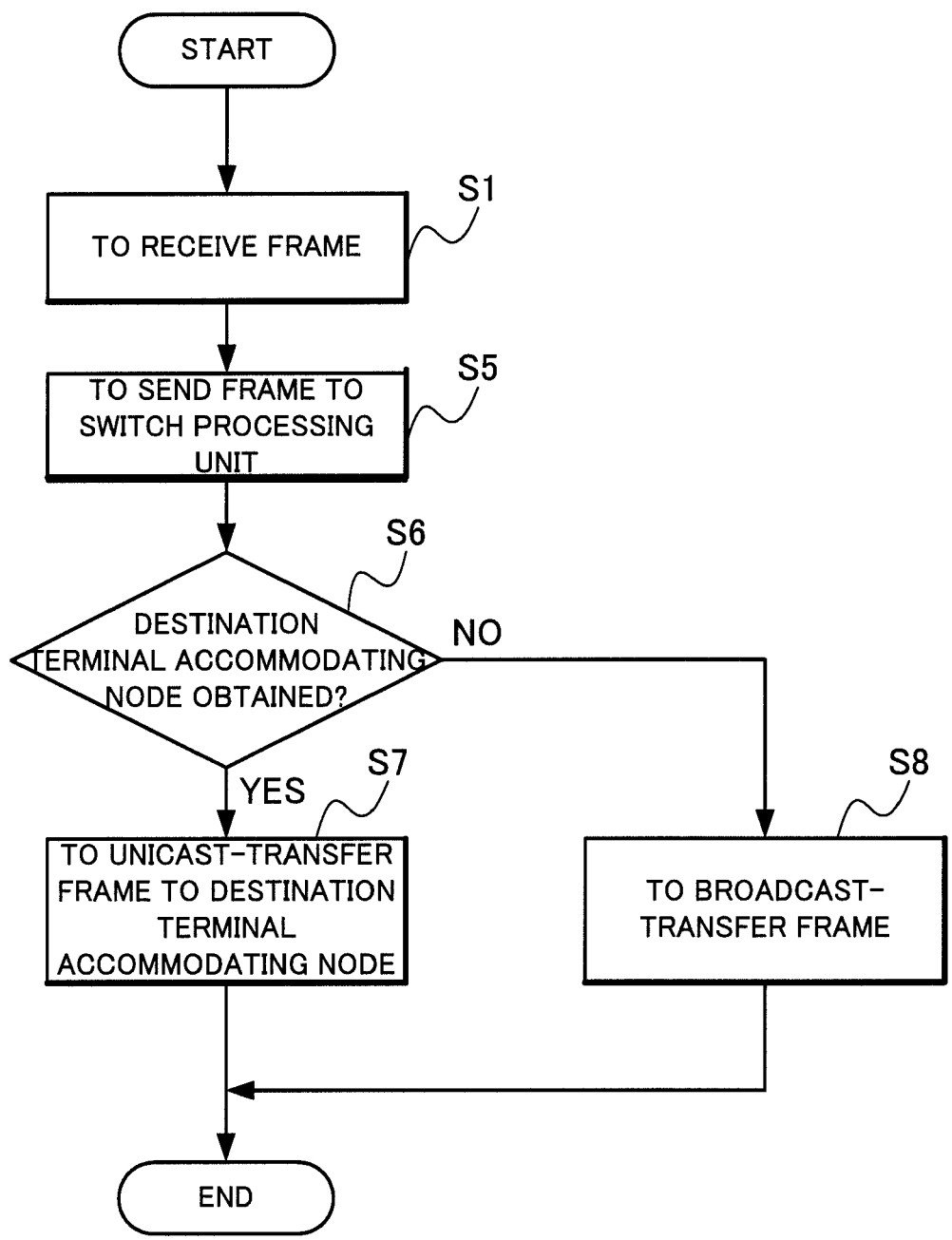
FIG. 24 is a flow chart showing operation of the RPR node according to the fourth exemplary embodiment.
Figure 25:
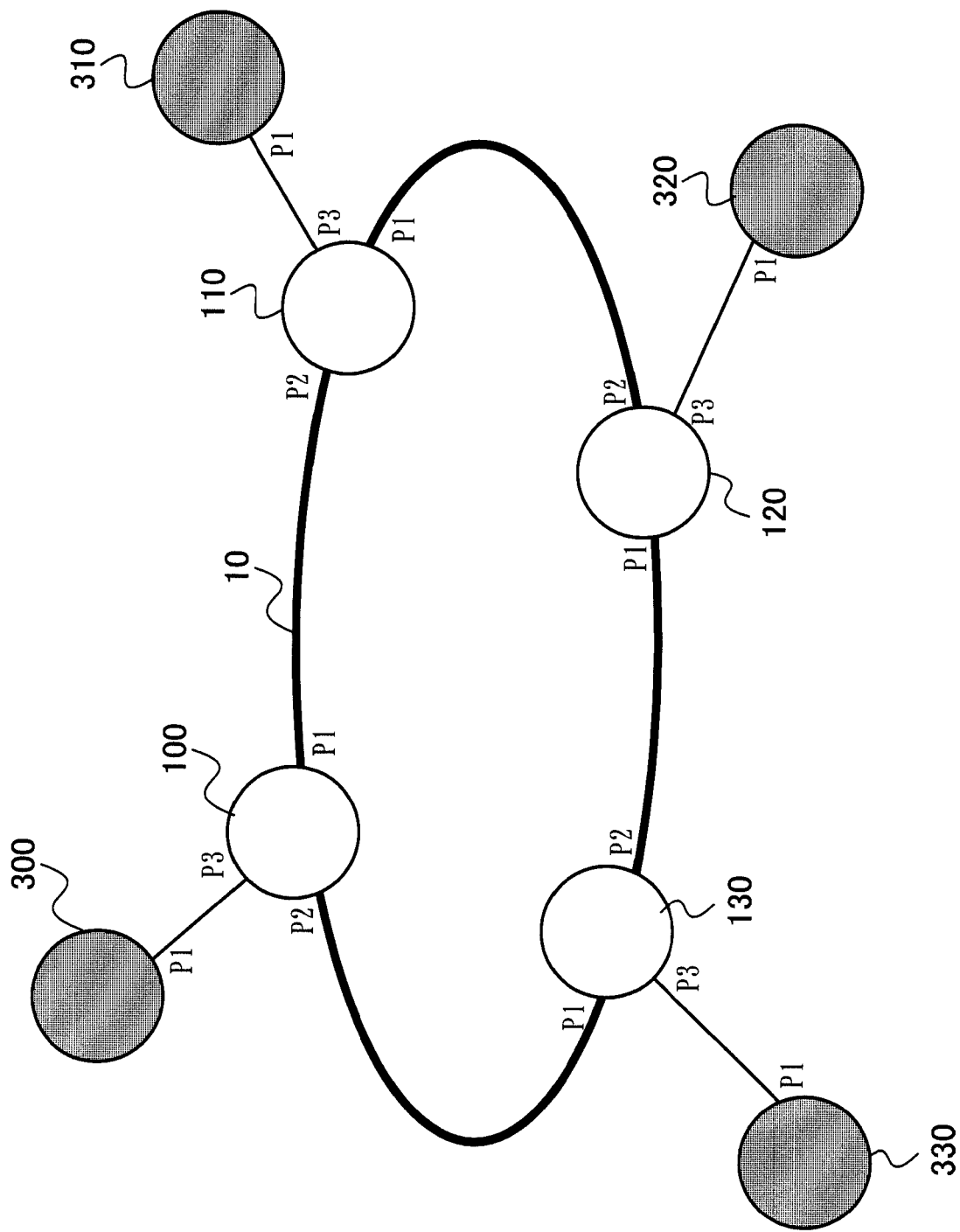
FIG. 25 is a diagram showing one example of a common RPR network formed of four RPR nodes.

Although in the following, description will be made of a case where the node 300 transmits a frame from the output port 660-1 of the node 300 as an example with reference to the flow chart shown in FIG. 24, this is also the case with frame transmission from the output port 660-2 of the node 300. FIG. 24 differs from FIG. 9 which shows the first exemplary embodiment in having none of Steps S2~S4 and Step S9.

Upon receiving a frame transmitted from the node 300 at the input port 400-3 of the RPR node 100 (Step S1), the RPR node 100 sends a frame to the switch processing unit 430 of the RPR node 100 (Step S5).

Since operation to follow until the frame is transferred to the node 320 as a destination terminal (Steps S6~S8) is the same as that of the first exemplary embodiment shown in FIG. 9, no description will be made thereof.

As described in the foregoing, by distributing a frame to either one of the RPR network 10 and the RPR network 20 at a time point when each of the nodes 300~330 transfers a frame to an RPR node in which the node itself is accommodated, a transmission capacity of the transmission system can be expanded similarly to the first exemplary embodiment. (Operation of Frame Transfer in Abnormal State)

In the following, description will be made of operation of transferring a frame to the node 320 by the node 300 in the abnormal state in the fourth exemplary embodiment.

Frame transfer operation executed in a case where even when abnormality occurs, there exists connectivity between all the RPR nodes forming the RPR network in both the RPR network 10 and the RPR network 20 is the same as the frame transfer operation in the normal state in the fourth exemplary embodiment similarly to the first exemplary embodiment.

Description will be made in the following of operation of transferring a frame directed to the node 320 from the node 300 when connectivity between all the RPR nodes forming the RPR network is lost in either the RPR network 10 or the RPR network 20.

In the first exemplary embodiment, in such abnormal state as described above, by referring to the FDB 440 and the TDB 450 of each RPR node, the network selection units 410 of the RPR nodes 100~130 and the RPR nodes 200~230 obtain an RPR network which is allowed to transfer a frame to an RPR node in which a destination terminal is accommodated among the RPR network 10 and the RPR network 20 and transmit the frame to the RPR network.

Figure 23:
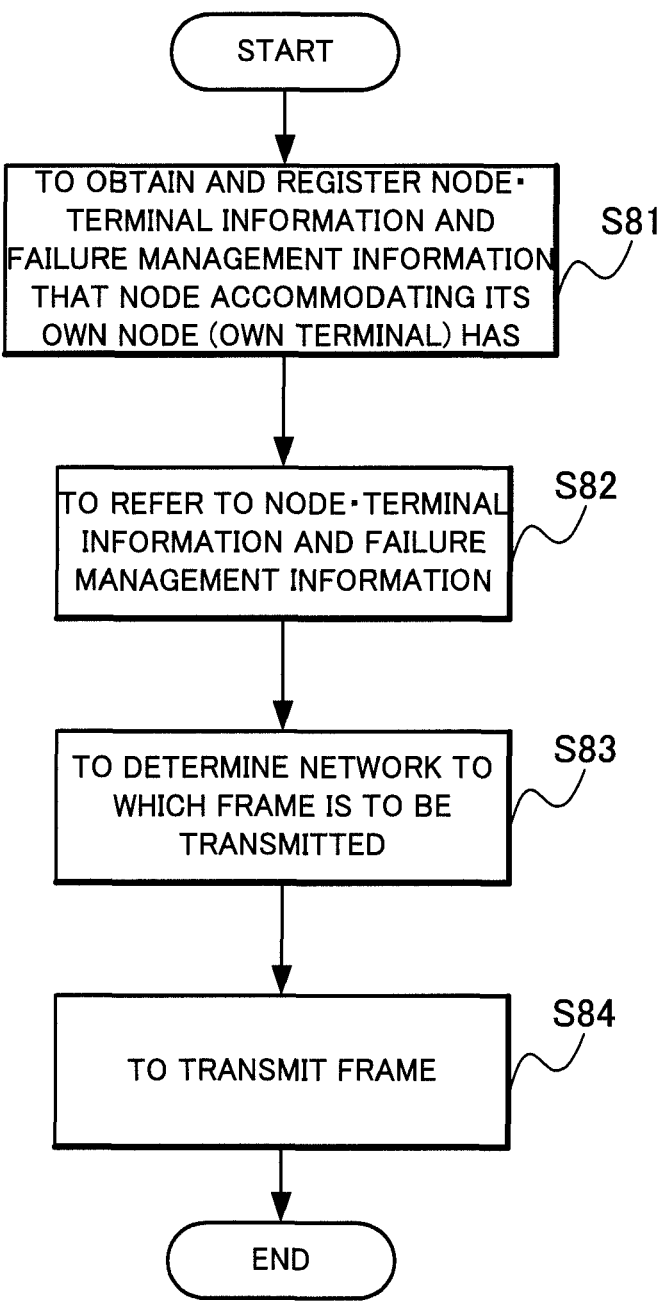
FIG. 23 is a flow chart showing operation of a terminal according to the fourth exemplary embodiment.

In the fourth exemplary embodiment, as shown in the above-described flow chart of FIG. 23, not the link selection units 410 of the RPR nodes 100~130 and the RPR nodes 200~230 but the network selection units 610 of the nodes 300~330 refer to the FDB 620 and the TDB 640 of the nodes 300~330 (Step S82) to confirm occurrence of abnormality in the network, obtain an RPR network which is allowed to transfer a frame and determine a network which will transfer the frame (Step S83).

When transferring a frame by the RPR network 10, the network selection unit 610 of the nodes 300~330 transmits a frame from the output port 660-1 of the nodes 300~330 (Step S84) or when transferring a frame by the RPR network 20, the unit transmits a frame from the output port 660-2 of the nodes 300~330 (Step S84).

Since operation of determining an RPR network which is allowed to transfer a frame executed by the network selection unit 610 of the nodes 300~330 is the same as the operation of determining an RPR network which is to transfer a frame executed by the link selection unit 410 of the RPR node 100 in the abnormal state in the first exemplary embodiment, no description will be made thereof.

Also operation of transferring a frame to a destination terminal after the RPR nodes 100~130 and the RPR nodes 200~230 receive the frame from the nodes 300~330 is the same as that executed before a frame is transferred in the normal state, so that no description will be made thereof.

As described in the foregoing, since also in the abnormal state, the network selection unit 610 of the nodes 300~330 distributes a frame to an RPR network which is allowed to transfer a frame to an RPR node in which a destination terminal is accommodated similarly to the network selection unit 410 of the RPR node 100 in the first exemplary embodiment, communication can be continued.

In the above-described method, similarly to the method of frame transfer in the normal state in the above-described present exemplary embodiment, the network selection unit 610 of the nodes 300~330, for determining an RPR network which will transfer a frame in the abnormal state, needs to register the contents of the FDB 440 of the RPR node in which the node itself is accommodated at the FDB 620 of the node itself (Step S81).

Referring only to the TDB 640 after deleting the FDB 620 and the FDB management unit 630 from the nodes 300~330, however, also enables an RPR network which will transfer a frame to be determined.

In this case, the operation of determining an RPR network which will transfer a frame executed by the network selection unit 610 of the nodes 300~330 is the same as the operation of determining an RPR network which will transfer a frame executed by the network selection unit 410 of the RPR node 100 when failing to obtain an RPR node in which a destination terminal is accommodated at the time of reference to the FDB 440 of the RPR node 100 in the first exemplary embodiment.

Since the above-described method eliminates the need of the FDB 620 and the FDB management unit 630 of the nodes 300~330, it has an advantage that the structure of the nodes 300~330 can be simplified.

The method, however, has a shortcoming that because in the abnormal state, a frame is transferred only by an RPR network having connectivity between all the RPR nodes forming the RPR network, a transmission capacity of all the RPR networks forming the communication system can not be used efficiently.

(Effects of the Fourth Exemplary Embodiment)

The present exemplary embodiment attains such effects as set forth below.

More specifically, similarly to the RPR node 100 in the first exemplary embodiment, the nodes 300~330 are allowed to distribute and transfer a frame to the RPR network 10 and the RPR network 20 in the normal state and the abnormal state.

The reason is that the node 300, with the network selection unit 610, the FDB 620, the FDB management unit 630, the TDB 640 and the TDB management unit 650, refers to the FDB 620 and the TDB 640 to determine a frame transfer destination.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-228940, filed on Aug. 5, 2005, the disclosure of which is incorporated herein in its entirety by reference.

The invention claimed is:

1. A communication system consisting of at least two ring networks, each ring network including a plurality of nodes, said communication system comprising:
a plurality of combinations of nodes, each combination of nodes is formed by selecting at least one node from each of the ring networks without overlapping with other nodes on the same ring network to which a selected node belongs, wherein the nodes forming the combination of nodes are connected with each other in the same combination of nodes; and
a plurality of terminals, wherein each terminal transmits and receives a data frame and is connected to any of said nodes forming to the same combination of nodes,
wherein said node belonging to said combination of nodes determines a destination ring network to distribute the data frame received from the terminal according to predetermined conditions, and when having determined own ring network, which is a ring network to which said node belongs, as the destination ring network to distribute the data frame, obtains a destination terminal accommodating node which accommodates a destination terminal of the data frame based on an address of the data frame and information related to topology of the ring networks, and transmits the data frame to the destination terminal accommodating node, and when having determined other ring network, which is a ring network to which the other node in the same combination of nodes belongs, as the destination ring network to distribute the data frame, transmits the data frame to the other node to transmit the data frame through the other ring network,
said predetermined conditions include a frame distribution algorithm and transfer conditions including an address of the data frame, a network load and priority, and
said information related to topology includes a topology state, failure occurrence condition and network connection information in the ring network corresponding to each of the nodes forming the combination of nodes.

2. The communication system according to claim 1, wherein said node belonging to said combination of nodes transmits a broadcast frame to all nodes on the own ring network when failed to obtain the destination terminal accommodating node.

3. The communication system according to claim 1, wherein said destination terminal accommodating node determines whether a port state of the destination terminal which is connected to said destination terminal accommodating node is valid or not, transmits the data frame to the destination terminal when the port state in said destination terminal accommodating node is valid, and performs authorization frame transfer to an authorized node whose port state of the destination terminal is valid when the port state in said destination terminal accommodating node is invalid, and
said destination terminal accommodating node and the authorized node form the combination of nodes and the data frame is transmitted to the destination terminal from the authorized node.

4. The communication system according to claim 3, wherein the port state in said destination terminal accommodating node and the port state in the authorized node are exchanged each other, and
both of the port states are registered in each of said destination terminal accommodating node and the authorized node.

5. The communication system according to claim 1, wherein said node which has obtained the destination terminal accommodating node, when connectivity between all nodes is lost in either of the ring networks, obtains a ring network which has connectivity with said node to the destination terminal accommodating node with reference to the information related to topology of the ring networks, and transmits the data frame to any of the nodes, in the combination of nodes, corresponding to the obtained ring network having the connectivity.

6. The communication system according to claim 1, wherein said node which has failed to obtain the destination terminal accommodating node, when connectivity between all nodes is lost in either of the ring networks, obtains a ring network which has connectivity with said node to all nodes forming the ring network with reference to the information related to topology of the ring networks, and transmits the data frame to any of the nodes, in the combination of nodes, corresponding to the obtained ring network having the connectivity.

7. The communication system according to claim 1, wherein said node which has received a broadcast frame from the terminal, when connectivity between all nodes is lost in all of the ring networks, selects either of ring network which has the largest number of nodes having connectivity as the ring network to which the broadcast frame is to be transmitted with reference to the information related to topology of the ring networks.

8. The communication system according to claim 1, wherein said node which has received a broadcast frame from the terminal, when connectivity between all nodes is lost in all of the ring networks, transmits the broadcast frame to all the ring networks forming the communication system, and
the node, which has received the broadcast frame from the other node, receives the broadcast frame transmitted from a specific ring network and abandons the broadcast frame transmitted from other ring network.

9. A node of a communication system consisting of at least two ring networks, each ring network including a plurality of nodes, wherein the node belongs to a ring network and forms a combination of nodes by connecting with at least one other node belonging to other ring network and a terminal, which transmits and receives a data frame and is connected to any of the nodes forming the combination of nodes, said node comprising:
- a network selection unit which is configured to determine a destination ring network to distribute the data frame received from the terminal according to predetermined conditions including a frame distribution algorithm and transfer conditions including an address of the data frame, a network load and priority;
- a database which is configured to store information related to topology which includes a topology state, failure occurrence condition and network connection information in the ring network corresponding to each of the nodes forming the combination of nodes; and
- a switch processing unit which is configured, when said network selection unit having determined own ring network, which is a ring network to which said node belongs, as the destination ring network to distribute the data frame, to obtain a destination terminal accommodating node which accommodates a destination terminal of the data frame based on an address of the data frame and the information related to topology of the ring networks stored in the database, and transmit the data frame to the destination terminal accommodating node, and when said network selection unit having determined other ring network, which is a ring network to which the other node in the same combination of nodes belongs, as the destination ring network to distribute the data frame, to transmit the data frame to the other node to transmit the data frame through the other ring network.

10. A non-transitory computer-readable medium storing a computer program, which when executed by a computer, causes the computer to execute functional processes of a node of a communication system consisting of at least two ring networks, each ring network including a plurality of nodes, wherein the node belongs to a ring network and forms a combination of nodes by connecting with at least one other node belonging to other ring network and a terminal, which transmits and receives a data frame and is connected to any of the nodes forming the combination of nodes, said processes comprising:
- determining process for determining a destination ring network to distribute the data frame received from the terminal according to predetermined conditions including a frame distribution algorithm and transfer conditions including an address of the data frame, a network load and priority;
- when own ring network, which is a ring network to which said node belongs, having been determined as the destination ring network to distribute the data frame in the determining process,
  - obtaining process, for obtaining destination terminal accommodating node which accommodates a destination terminal of the data frame based on an address of the data frame and information related to topology of the ring networks; and
  - transmitting process for transmitting the data frame to the destination terminal accommodating node; and
- when other ring network, which is a ring network to which the other node in the same combination of nodes belongs, having been determined as the destination ring network to distribute the data frame in the determining process,
  - transmitting process for transmitting the data frame to the other node to transmit the data frame through the other ring network,
- wherein said information related to topology includes a topology state, failure occurrence condition and network connection information in the ring network corresponding to each of the nodes forming the combination of nodes.

11. A communication method by a node of a communication system consisting of at least two ring networks, each ring network including a plurality of nodes, wherein the node belongs to a ring network and forms a combination of nodes by connecting with at least one other node belonging to other ring network and a terminal, which transmits and receives a data frame and is connected to any of the nodes forming the combination of nodes, said method comprising:
- a determining step for determining a destination ring network to distribute the data frame received from the terminal according to predetermined conditions including a frame distribution algorithm and transfer conditions including an address of the data frame, a network load and priority;
- when own ring network, which is a ring network to which said node belongs, having been determined as the destination ring network to distribute the data frame in the determining step,
  - an obtaining step, for obtaining destination terminal accommodating node which accommodates a destination terminal of the data frame based on an address of the data frame and information related to topology of the ring networks; and
  - a transmitting step for transmitting the data frame to the destination terminal accommodating node; and
- when other ring network, which is a ring network to which the other node in the same combination of nodes belongs, having been determined as the destination ring network to distribute the data frame in the determining step,
  - a transmitting step for transmitting the data frame to the other node to transmit the data frame through the other ring network,
- wherein said information related to topology includes a topology state, failure occurrence condition and network connection information in the ring network corresponding to each of the nodes forming the combination of nodes.

* * * * *